US012484785B2

(12) United States Patent
Yang et al.

(10) Patent No.: US 12,484,785 B2
(45) Date of Patent: Dec. 2, 2025

(54) MICROSCOPY IMAGING SYSTEM AND METHODS

(71) Applicant: University of Rochester, Rochester, NY (US)

(72) Inventors: Qiang Yang, Rochester, NY (US); Jennifer Hunter, Rochester, NY (US); Keith Parkins, Rochester, NY (US)

(73) Assignee: University of Rochester, Rochester, NY (US)

( * ) Notice: Subject to any disclaimer, the term of this patent is extended or adjusted under 35 U.S.C. 154(b) by 748 days.

(21) Appl. No.: 17/812,494

(22) Filed: Jul. 14, 2022

(65) Prior Publication Data

US 2023/0022632 A1 Jan. 26, 2023

Related U.S. Application Data

(60) Provisional application No. 63/221,989, filed on Jul. 15, 2021.

(51) Int. Cl.
*A61B 5/00* (2006.01)
*A61B 3/13* (2006.01)
(Continued)

(52) U.S. Cl.
CPC .............. *A61B 5/0071* (2013.01); *A61B 3/13* (2013.01); *A61B 5/14555* (2013.01); *G02B 21/0048* (2013.01); *G02B 21/16* (2013.01)

(58) Field of Classification Search
CPC ..... A61B 5/0071; A61B 3/13; A61B 5/14555; A61B 3/10; G02B 21/0048; G02B 21/16; G02B 21/0076; G02B 21/365
See application file for complete search history.

(56) References Cited

U.S. PATENT DOCUMENTS 9,226,656 B2  1/2016  Yang
9,406,133 B2  8/2016  Yang
(Continued)

FOREIGN PATENT DOCUMENTS

CA          2777315 C    5/2013

OTHER PUBLICATIONS

Gray, "Volumetric imaging of rod and cone photoreceptor structure with a combined adaptive optics-optical coherence tomography-scanning laser ophthalmoscope," J. Biomed. Opt. 23(3), 036003 (Year: 2018).*

(Continued)

*Primary Examiner* — Thomas K Pham
*Assistant Examiner* — Jennifer A Jones
(74) *Attorney, Agent, or Firm* — Riverside Law LLP

(57) ABSTRACT

A microscopy imaging system comprises a fluorescence lifetime imaging microscopy (FLIM) system comprising a pulsed light source configured to direct a plurality of excitation light pulses onto a sample, a photo detector configured to detect emitted fluorescent photons created by the plurality of excitation pulses interacting with the sample, and a FLIM data acquisition system configured to measure the time interval between the excitation light pulses and the detected emitted fluorescent photons, a scanning light microscopy (SLM) system comprising a SLM data acquisition system, a fast scanning mirror and a slow scanning mirror, wherein the mirrors are configured to scan the light pulses across the sample; and a data processing system communicatively connected to the FLIM and SLM systems. Microscopy imaging methods are also disclosed.

17 Claims, 20 Drawing Sheets

(51) Int. Cl.
  *A61B 5/1455* (2006.01)
  *G02B 21/00* (2006.01)
  *G02B 21/16* (2006.01)

(56) References Cited

U.S. PATENT DOCUMENTS

| | | | |
|---|---|---|---|
| 9,485,383 | B2 | 11/2016 | Nozato |
| 10,092,181 | B2 | 10/2018 | Yang |
| 2015/0042954 | A1 | 2/2015 | Hunter |
| 2016/0073876 | A1* | 3/2016 | Akita ............... G02B 27/145 351/206 |
| 2018/0356344 | A1* | 12/2018 | Yi ..................... G02B 26/085 |
| 2020/0400933 | A1* | 12/2020 | Hecht ............... G02B 21/16 |
| 2023/0233075 | A1* | 7/2023 | Robledo ........... A61B 5/0066 356/479 |

OTHER PUBLICATIONS

S-334 Miniature Piezo Tip/Tilt-Mirror Spec (Year: 2008).*

Aby Joseph, Colin J Chu, Guanping Feng, Kosha Dholakia, Jesse Schallek, Label-free imaging of immune cell dynamics in the living retina using adaptive optics, eLife 2020;9:e60547 DOI: 10.7554/eLife.60547, https://elifesciences.org/articles/60547.

Adrian Gh. Podoleanu, Richard B. Rosen, Combinations of techniques in imaging the retina with high resolution, Progress in Retinal and Eye Research, vol. 27, Issue 4, 2008, pp. 464-499, ISSN 1350-9462, https://doi.org/10.1016/j.preteyeres.2008.03.002.

C. Dysli, M. Dysli, V. Enzmann, S. Wolf, and M. S. Zinkernagel, "Fluorescence Lifetime Imaging of the Ocular Fundus in Mice," Invest. Ophthalmol. Vis. Sci. 55(11), 7206-7215 (2014).

C. E. Granger, Q. Yang, H. Song, K. Saito, K. Nozato, L. R. Latchney, B. T. Leonard, M. M. Chung, D. R. Williams, and E. A. Rossi, "Human retinal pigment epithelium: In vivo cell morphometry, multispectral autofluorescence, and relationship to cone mosaic," Investig. Ophthalmol. Vis. Sci. 59, 5705-5716 (2018).

Charles E. Granger, Qiang Yang, Hongxin Song, Kenichi Saito, Koji Nozato, Lisa R. Latchney, Bianca T. Leonard,. Mina M. Chung, David R. Williams, and Ethan A. Rossi, Human Retinal Pigment Epithelium: In Vivo Cell Morphometry, Multispectral Autofluorescence, and Relationship to Cone Mosaic, Invest Ophthalmol Vis Sci., 59(15), 5705-5716 (2018).

D. Schweitzer, M. Hammer, F. Schweitzer, R. Anders, T. Doebbecke, S. Schenke, E. R. Gaillard, and E. R. Gaillard, "In vivo measurement of time-resolved autofluorescence at the human fundus," J. Biomed. Opt. 9(6), 1214-1222 (2004).

D. Schweitzer, S. Schenke, M. Hammer, F. Schweitzer, S. Jentsch, E. Birckner, W. Becker, and A. Bergmann, "Towards metabolic mapping of the human retina," Microsc. Res. Tech. 70(5), 410-419 (2007).

David W. Arathorn, Qiang Yang, Curtis R. Vogel, Yuhua Zhang, Pavan Tiruveedhula, and Austin Roorda, Retinally stabilized cone-targeted stimulus delivery, Optics Express vol. 15, Issue 21, pp. 13731-13744 (2007) https://doi.org/10.1364/OE.15.013731.

Dubra, A., Sulai, Y., Norris, J., Cooper, R., Dubis, A., Williams, D.R., Carroll, J. (2011). Non-invasive in vivo imaging of the human rod photoreceptor mosaic using a confocal adaptive optics scanning ophthalmoscope. Biomedical Optics Express, 2(7), 1864-1876 doi:10.1364/BOE.2.001864.

Feeks JA & Hunter JJ. Adaptive optics two-photon excited fluorescence lifetime imaging ophthalmoscopy of exogenous fluorophores in mice. Biomed. Opt. Express 8, 2483-2495 (2017).

Gray, D., Merigan, W., Wolfing, J., Gee, B., Porter, J., Dubra, A., Twietmeyer, T., Ahmad, K., Tumbar, R., Reinholz, F., Williams, D.R. (2006). In vivo fluorescence imaging of primate retinal ganglion cells and retinal pigment epithelial cells. Optics Express, 14(16), 7144-7158.

L. Curiel, R. Chopra and K. Hynynen, "Progress in Multimodality Imaging: Truly Simultaneous Ultrasound and Magnetic Resonance Imaging," in IEEE Transactions on Medical Imaging, vol. 26, No. 12, pp. 1740-1746, Dec. 2007, doi: 10.1109/TMI.2007.903572.

La Schiazza O, Bille JF. High-speed two-photon excited autofluorescence imaging of ex vivo human retinal pigment epithelial cells toward age-related macular degeneration diagnostic. J Biomed Opt. Nov.-Dec. 2008;13(6):064008. doi: 10.1117/1.2999607. PMID: 19123655.

Lorenzo Scipioni, Alessandro Rossetta, Giulia Tedeschi, Enrico Gratton, "Phasor S-FLIM: a new paradigm for fast and robust spectral fluorescence lifetime imaging", Nature Methods, 18(5):542-550. doi: 10.1038/s41592-021-01108-4, (2021).

M. Tantama, Y. P. Hung, and G. Yellen, "Imaging intracellular pH in live cells with a genetically encoded red fluorescent protein sensor," J. Am. Chem. Soc. 133(26), 10034-10037 (2011).

Pearse A. Keane, Srinivas R. Sadda, Retinal Imaging in the Twenty-First Century: State of the Art and Future Directions, Ophthalmology, vol. 121, Issue 12, 2014, pp. 2489-2500, ISSN 0161-6420, https://doi.org/10.1016/j.ophtha.2014.07.054.

Q. Yang, J. Zhang, K. Nozato, K. Saito, D. R. Williams, A. J. Roorda, and R. A. Rossi, "Closed-loop optical stabilization and digital image registration in adaptive optics scanning light ophthalmoscopy," Biomed. Opt. Express, 5(9), 3174-3191 (2014).

Qiang Yang, David W. Arathorn, Pavan Tiruveedhula, Curtis R. Vogel, and Austin Roorda, Design of an integrated hardware interface for AOSLO image capture and cone-targeted stimulus delivery, Optics Express vol. 18, Issue 17, pp. 17841-17858 (2010) https://doi.org/10.1364/OE.18.017841.

Qiang Yang, Lu Yin, Koji Nozato, Jie Zhang, Kenichi Saito, William H. Merigan, David R. Williams, and Ethan A. Rossi, Calibration-free sinusoidal rectification and uniform retinal irradiance in scanning light ophthalmoscopy, Optics Letters, vol. 40, Issue 1, pp. 85-88 (2015).

R. Daniel Ferguson, Zhangyi Zhong, Daniel X. Hammer, Mircea Mujat, Ankit H. Patel, Cong Deng, Weiyao Zou, and Stephen A. Burns, "Adaptive optics scanning laser ophthalmoscope with integrated wide-field retinal imaging and tracking," J. Opt. Soc. Am. A 27, A265-A277 (2010).

Sami V. Koho, Eli Slenders, Giorgio Tortarolo, Marco Castello, Mauro Buttafava, Federica Villa, Elena Tcarenkova, Marcel Ameloot, Paolo Bianchini, Colin J. R. Sheppard, Alberto Diaspro, Alberto Tosi, and Giuseppe Vicidomini, "Two-photon image-scanning microscopy with SPAD array and blind image reconstruction," Biomed. Opt. Express 11, 2905-2924 (2020).

Sharma R, Schwarz C, Williams DR, Palczewska G, Palczewski K, Hunter JJ (2016). In vivo TwoPhoton Fluorescence Kinetics of Primate Rods and Cones. Invest Ophthalmol Vis Sci. 57(2):647-57. doi: 10.1167/iovs.15-17946. PMID: 26903225.

Sharma R, Yin L, Geng Y, Merigan W, Palczewska G, Palczewski K, Williams D, Hunter J (2013), In vivo two-photon imaging of the mouse retina. Biomed. Opt. Express 4, 1285-1293.

Stephen A. Burns, Ann E. Elsner, Kaitlyn A. Sapoznik, Raymond L. Warner, Thomas J. Gast, Adaptive optics imaging of the human retina, Progress in Retinal and Eye Research, vol. 68, 2019, pp. 1-30, ISSN 1350-9462, https://doi.org/10.1016/j.preteyeres.2018.08.002.

Theodore DuBose, Derek Nankivil, Francesco LaRocca, Gar Waterman, Kristen Hagan, James Polans, Brenton Keller, Du Tran-Viet, Lejla Vajzovic, Anthony N. Kuo, Cynthia A. Toth, Joseph A. Izatt, and Sina Farsiu, "Handheld adaptive optics scanning laser ophthalmoscope," Optica 5, 1027-1036 (2018).

Xinqi Hu and Qiang Yang, "Modeling and optimization of closed-loop retinal motion tracking in scanning light ophthalmoscopy", Journal of the Optical Society of America A vol. 36, Issue 5, pp. 716-721 (2019) https://doi.org/10.1364/JOSAA.36.000716.

Zhang J, Yang Q, Saito K, Nozato K, Roorda A, Williams DR, and Rossi EA (2015). An adaptive optics imaging system designed for clinical use: publisher's note. Biomed. Opt. Express 6, 2864-2864.

* cited by examiner

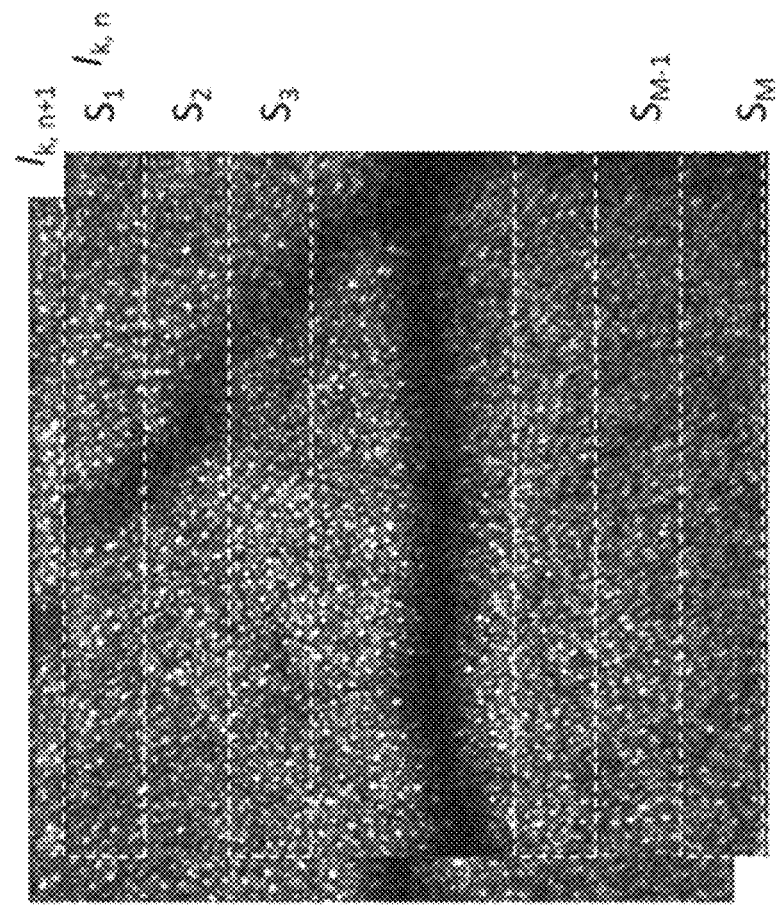
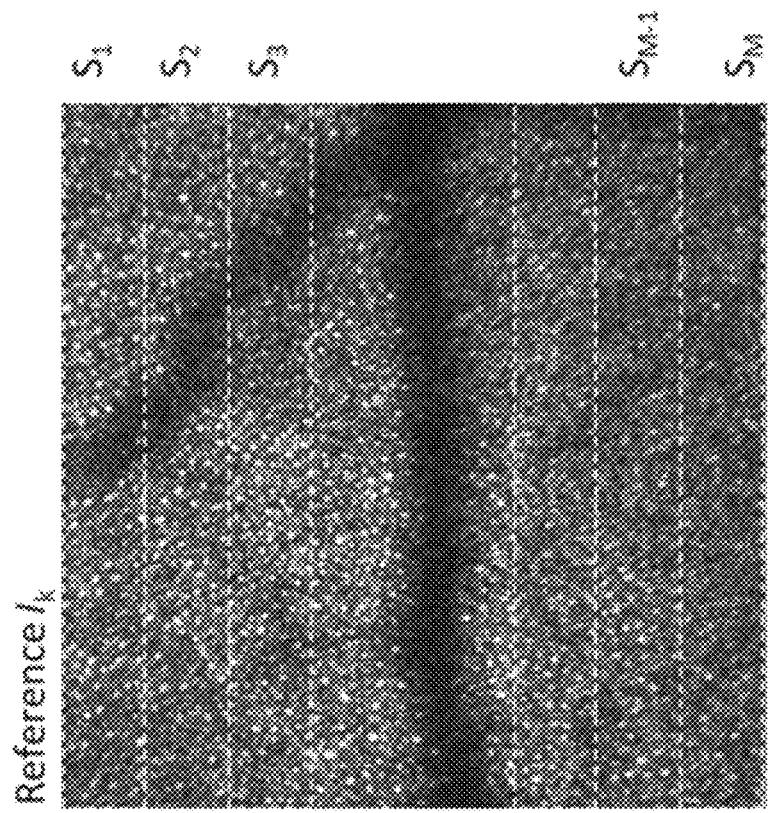
FIG. 13

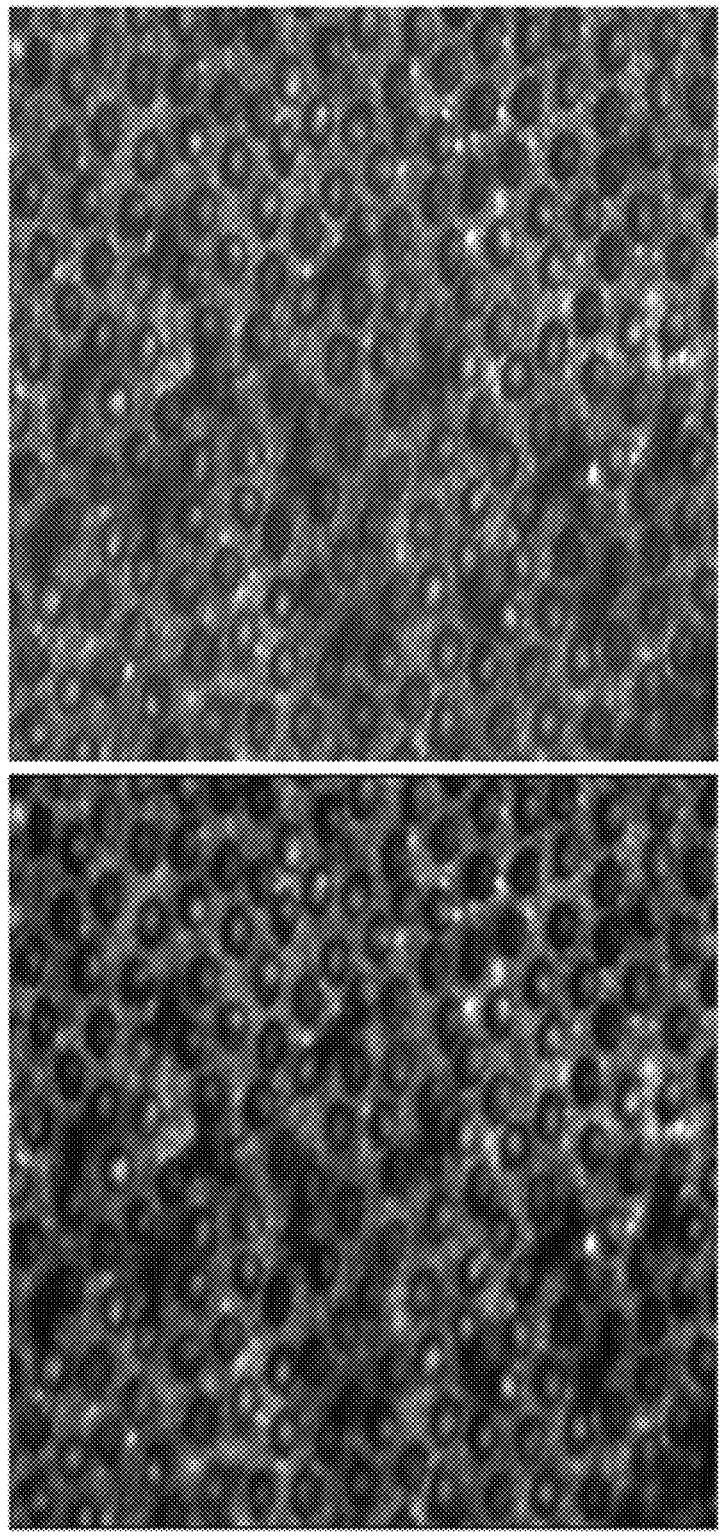
FIG. 14A Direct output of optical tracking
FIG. 14B additional digital registration

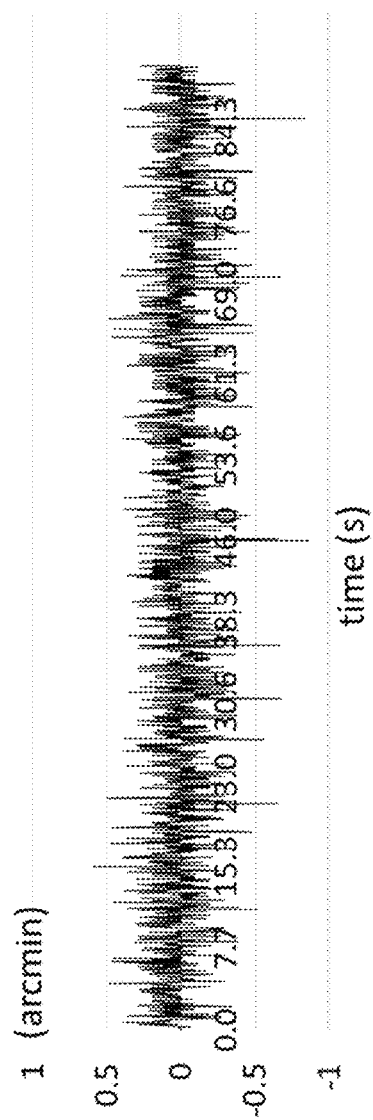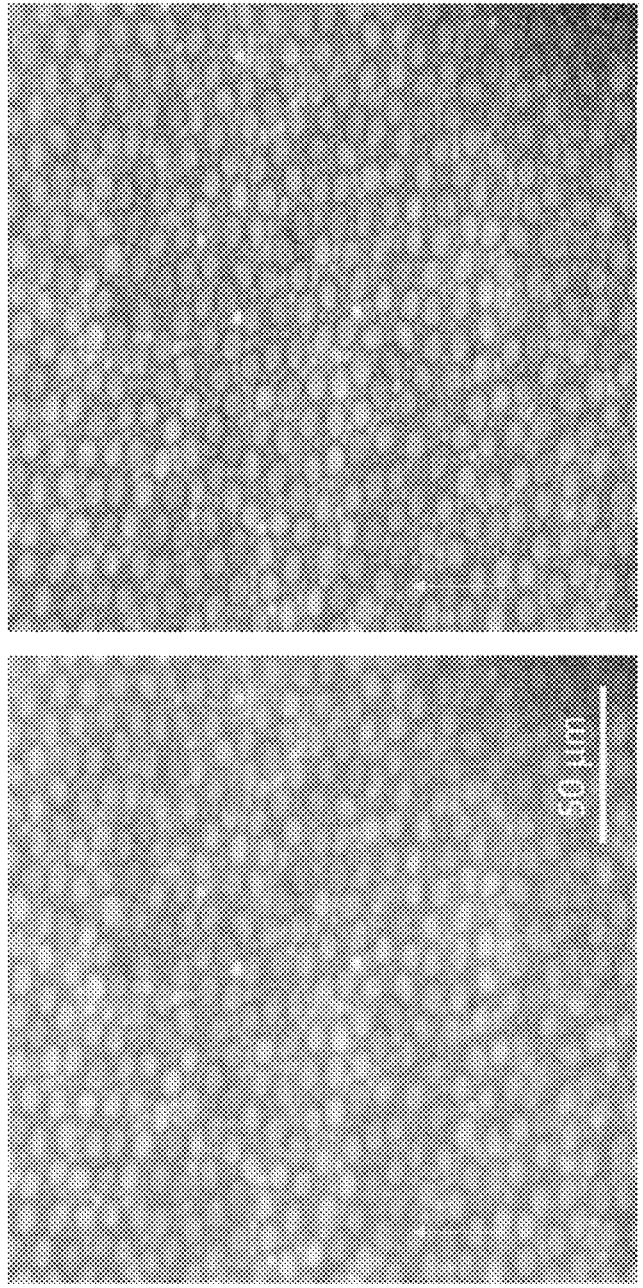
FIG. 15A
FIG. 15B
FIG. 15C

MICROSCOPY IMAGING SYSTEM AND METHODS

CROSS-REFERENCE TO RELATED APPLICATIONS

This application claims priority to U.S. provisional application No. 63/221,989 filed on Jul. 15, 2021, incorporated herein by reference in its entirety.

STATEMENT REGARDING FEDERALLY SPONSORED RESEARCH OR DEVELOPMENT

This invention was made with government support under EY001319, EY004367 and EY022371 awarded by National Institutes of Health. The government has certain rights in the invention.

BACKGROUND

Microscopy imaging has been utilized by many researchers to further understanding of scientific processes in a wide range of fields including medicine and biology. Fluorescence is the emission of light by some substances that have absorbed electromagnetic radiation. Many important biologic molecules fluoresce.

Fluorescence lifetime imaging microscopy (FLIM) is a form of microscopy imaging and has been widely used in industry and academia. An excitation source such as a pulsed laser is used to excite fluorescent photons from a sample or a biological specimen. The laser source delivers very short laser pulses (in picoseconds or even femtoseconds) periodically at various frequencies to the sample, but only a very small fraction of the laser pulses will excite photons from the sample. This is applicable to any fluorescence imaging including single-photon, two-photon, three-photon or n-photon imaging.

A photo detector such as a photomultiplier tube (PMT), a photon-counting PMT, a hybrid PMT, an avalanched photodiode (APD) a photon-counting APD, a silicon photomultiplier (SiPM), or similar detector, is used to detect the emitted fluorescent photons, usually in the sensitivity of detecting a single photon. Fluorescence can originate from intrinsic (naturally occurring) or extrinsic (added to sample) fluorescent molecules.

Time-correlated single photon counting (TCSPC) is a widely used technology for detecting photon arrival time for fluorescent photons. There are multiple suppliers of TCSPC devices on the market such as Becker & Hickl GmbH (Berlin, Germany), PicoQuant (Berlin, Germany), AZoNetwork (Manchester, UK), and many others. These devices have been successfully implemented in non-scan and scan instruments, but at slow sampling rates. In recent years TCSPC has gained more interest in industry and academia in the scanning light microscopy (SLM). However, there are several major technical issues when these off-shelf TCSPC devices are integrated in SLM systems.

Scanning light microscopy (SLM) is another form of microscopy imaging. In SLM, such as confocal microscopy (CM), scanning light ophthalmoscopy (SLO), or adaptive optics scanning light ophthalmoscopy (AOSLO), the light beam to excite the sample can go through two scanning mirrors, a fast scanning mirror with linear and/or nonlinear motion, and a slow scanning mirror with linear and/or nonlinear motion. A photo detector such as a photomultiplier tube (PMT), a photon-counting PMT, a hybrid PMT, an avalanche photodiode (APD), a photon-counting APD, a silicon photomultiplier (SiPM), or similar detector is used to detect reflectance photons and fluorescence photons, usually in the sensitivity of detecting a single to multiple photons.

Combining microscopy imaging techniques such as FLIM and SLM can provided for enhanced imaging. In a specific example, FLIM and SLO can be combined to perform retinal imaging to investigate retinal structure and function in regard to retinal health and disease. In other examples, combining microscopy imaging techniques can be used for imaging of fluorescence lifetimes in applications including scanning brain tissue, C. elegans, skin tissue, and cancerous tissue, etc., and can further be utilized in situations when scanning speeds are fast, unpredictable, and/or when a sample is moving. Additionally, the combined microscopy imaging techniques can utilize scanning techniques such as Raster scans, line scans, and point-of-interest scans, However, combining off the shelf components suited for individual microscopy imaging techniques, such as FLIM and SLM, into a single system has many technical difficulties and limitations, such as slow sample rates, limited resolutions, non-matched clock sampling frequencies, image distortion inherent to some imaging systems, and image distortion from sample movement while the imaging process is occurring. Thus, there is a need in the art for improvements in microscopy imaging, specifically the combination of FLIM and SLM.

SUMMARY

Some embodiments of the invention disclosed herein are set forth below, and any combination of these embodiments (or portions thereof) may be made to define another embodiment.

In one aspect, a microscopy imaging system comprises a fluorescence lifetime imaging microscopy (FLIM) system comprising a pulsed light source configured to direct a plurality of excitation light pulses onto a sample, a photo detector configured to detect emitted fluorescent photons created by the plurality of excitation pulses interacting with the sample, and a FLIM data acquisition system configured to measure the time interval between the excitation light pulses and the detected emitted fluorescent photons, a scanning light microscopy (SLM) system comprising a SLM data acquisition system, a fast scanning mirror and a slow scanning mirror, wherein the mirrors are configured to scan the light pulses across the sample, and a data processing system communicatively connected to the FLIM and SLM systems, including a non-transitory computer-readable medium with instructions stored thereon, that when executed by a processor, performs steps comprising receiving data signals from the FLIM and SLM data acquisition systems, creating SLM reflectance images from the SLM data signals, choosing a reference image from the SLM reflectance images, spatially aligning the SLM reflectance images to the SLM reference image, creating FLIM intensity images and photon arrival time data from the FLIM data signals, dynamically optimizing an optical pinhole location and imaging focal plane of the FLIM signals by using real-time FLIM intensity signals to achieve a maximum FLIM photon flux rate and an optimized FLIM image contrast, and spatially aligning the FLIM intensity images and photon arrival time data to the spatially aligned SLM reflectance images.

In one embodiment, the step of spatial aligning the FLIM intensity images and photon arrival time data and the SLM reflectance images comprises correcting for sample movement. In one embodiment, the FLIM and SLM data signals are acquired simultaneously. In one embodiment, the FLIM system has a cellular level resolution.

In one embodiment, wherein the instructions further perform the steps of calculating transverse chromatic aberration (TCA) between the spatially aligned FLIM images and SLM reflectance images, compensating for TCA variation encoded in the FLIM images, receiving multiple timing marks from the SLM data acquisition system based on when the SLM data acquisition system starts and stops recording, removing FLIM data signals outside of a timing window described by the timing marks, and removing scan image distortion from the data signals.

In one embodiment, the timing marks include the time when the SLM system starts data signal recording, the time when the SLM system stop data signal recording, a periodic time of a frame synchronization clock of the SLM system, and a periodic time of a line synchronization clock of the SLM system. In one embodiment, the reference image is a composite image.

In one embodiment, the fast scanning mirror is a fast-resonant scanning mirror, and the slow scanning mirror is a slow linear scanning mirror. In some embodiments, more than two mirrors are utilized. In one embodiment, the fast scanning mirror is a fast polygon scanning mirror, and the slow scanning mirror is a slow linear scanning mirror. In one embodiment, wherein the fast scanning mirror is configured to scan the excitation light pulses across the sample at a rate between 1 kHz and 100 kHz. In one embodiment, the slow scanning mirror is configured to scan the excitation light pulses across the sample at a rate between 0 Hz and 100 Hz. In one embodiment, the scanning motions of the fast and slow scanning mirror are synchronized.

In one embodiment, the SLM system comprises a scanning light ophthalmoscopy (SLO) system. In one embodiment, the SLM system comprises an adaptive optics scanning light ophthalmoscopy (AOSLO) system. In one embodiment, the sample is a biological specimen. In one embodiment, the sample is a retina.

In another aspect a microscopy imaging method comprises providing a fluorescence lifetime imaging microscopy (FLIM) system comprising a pulsed light source configured to direct a plurality of excitation light pulses onto a sample, a photo detector configured to detect emitted fluorescent photons created by the plurality of excitation pulses interacting with the sample, and a FLIM data acquisition system configured to measure the time interval between the excitation light pulses and the detected emitted fluorescent photons, providing a scanning light microscopy (SLM) system comprising a SLM data acquisition system, a fast scanning mirror and a slow scanning mirror, wherein the mirrors are configured to scan the light pulses across the sample, providing a data processing system communicatively connected to the FLIM and SLM systems, receiving data signals from the FLIM and SLM data acquisition systems, creating SLM reflectance images from the SLM data signals, choosing a reference image from the recorded SLM reflectance images, spatially aligning the SLM reflectance images to the SLM reference image, creating FLIM intensity images and photon arrival time data from the FLIM data signals, dynamically optimizing an optical pinhole location and imaging focal plane of the FLIM signals by using real-time FLIM intensity signals to achieve a maximum FLIM photon flux rate and an optimized FLIM image contrast, and spatially aligning the FLIM intensity images and photon arrival time data to the spatially aligned SLM reflectance images.

In one embodiment, the method further comprises acquiring data signals via the FLIM system and SLM system simultaneously. In one embodiment, the method further comprises removing scan image distortion from the data signals. In one embodiment, the distortion removed from the scanning system is sinusoidal distortion. In one embodiment, the method further comprises generating a look up table to remove the sinusoidal distortion. In one embodiment, the method further comprises aligning forward scan data signals in a first data region and backward scan data signals in a second region of the data signals. In one embodiment, the method further comprises generating a second look up table to compensate for motion of the fast scanning mirror. In one embodiment, the method further comprises generating a third look up table to compensate for motion of the slow scanning mirror.

In one embodiment, the method further comprises mirroring the identified backward scan data signals and summing the mirrored backward scan data signals with the forward scan data signals to increase the signal to noise ratio. In one embodiment, the method further comprises cropping data signals from the time that at least one of the scanning mirrors are retracting. In one embodiment, the method further comprises co-registering the data signals post processing via a frame or strip level motion calculation to improve resolution by accounting for finer sample movement.

In one embodiment, the SLM system comprises a scanning light ophthalmoscopy (SLO) system. In one embodiment, the SLM system comprises an adaptive optics scanning light ophthalmoscopy (AOSLO) system. In one embodiment, the sample is an in vivo sample. In one embodiment, the sample is a retina. In one embodiment, the sample is an in vivo retina.

In one embodiment, the method further comprises sending at least one synchronization trigger signal from the SLM system to the FLIM system. In one embodiment, the at least one synchronization trigger signal is provided by an FPGA.

In another aspect a method for in vivo retinal microscopy imaging comprises providing a fluorescence lifetime imaging microscopy (FLIM) system comprising a pulsed light source configured to direct a plurality of excitation light pulses onto a retina, a photo detector configured to detect emitted fluorescent photons created by the plurality of excitation pulses interacting with the retina, and a FLIM data acquisition system configured to measure the time interval between the excitation light pulses and the detected emitted fluorescent photons, providing a scanning light ophthalmoscopy (SLO) system comprising a SLO data acquisition system, a fast scanning mirror and a slow scanning mirror, wherein the mirrors are configured to scan the light pulses across the retina, providing a data processing system communicatively connected to the FLIM and SLO systems, receiving data signals at the data processing system from the FLIM and SLO data acquisition systems, creating SLO reflectance retina images from the SLO data signals, choosing a reference retina image from the recorded SLO retina reflectance images, spatially aligning the SLO reflectance retina images to the SLO reference retina image, creating FLIM intensity images and retina photon arrival time data from the FLIM data signals, dynamically optimizing an optical pinhole location and imaging focal plane of the FLIM signals by using real-time FLIM intensity signals to achieve a maximum FLIM photon flux rate and an optimized FLIM image contrast, and spatially aligning the FLIM intensity images and retina photon arrival time data to the spatially aligned SLO reflectance retina images.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which:

FIG. 13 shows an example experimental SLO reference image and technique of strip-level image registration from the microscopy imaging system in accordance with some embodiments.

FIGS. 14A and 14B show a comparison of two example experimental SLO images of the same retinal location from the microscopy imaging system in accordance with some embodiments.

FIG. 15A shows an example experimental set of residual image motion after optical tracking from an anesthetized monkey typically in 0.15-0.25 arcmin RMS in accordance with some embodiments.

FIGS. 15B and 15C show a comparison of two example experimental FLIM images of the same retinal location from the microscopy imaging system in accordance with some embodiments.

DETAILED DESCRIPTION

Figure 1:
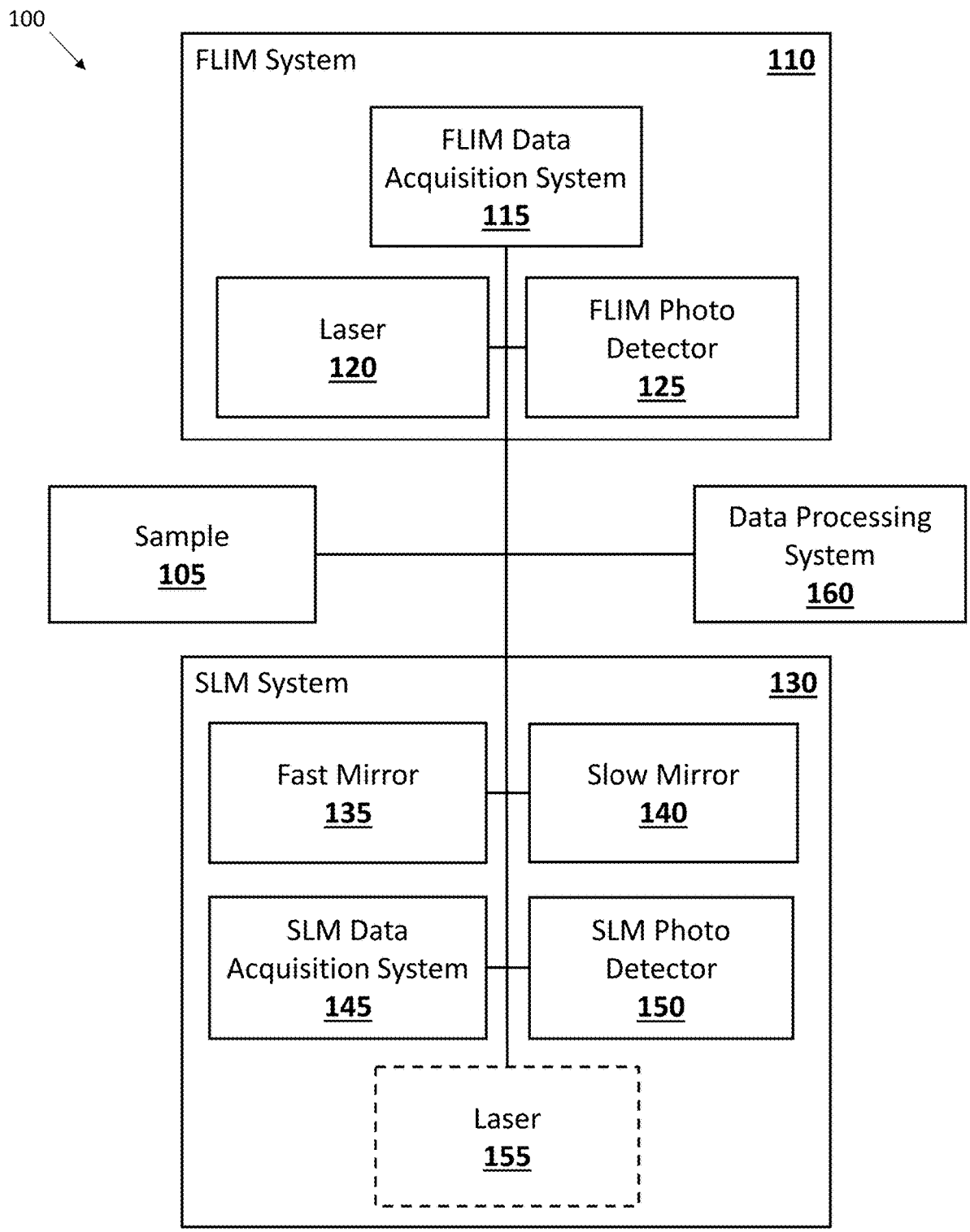
FIG. 1 is a block diagram showing a microscopy imaging system in accordance with some embodiments.

It is to be understood that the figures and descriptions of the present invention have been simplified to illustrate elements that are relevant for a clearer comprehension of the present invention, while eliminating, for the purpose of clarity, many other elements found in systems and methods of microscopy imaging. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Ranges: throughout this disclosure, various aspects of the invention can be presented in a range format. It should be understood that the description in range format is merely for convenience and brevity and should not be construed as an inflexible limitation on the scope of the invention. Where appropriate, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Referring now in detail to the drawings, in which like reference numerals indicate like parts or elements throughout the several views, in various embodiments, presented herein is a microscopy imaging system and methods.

FIG. 1 is a block level system diagram depicting a microscopy imaging system 100. The system 100 includes a fluorescence lifetime imaging microscopy (FLIM) system 110, a scanning light microscopy (SLM) system 130, and a data processing system 160 communicatively connected to the FLIM system 110 and SLM system 130.

In some embodiments, the FLIM system 110 can include a light source 120 configured to direct excitation light onto a sample 105. In some embodiments, the light 120 is a pulsed laser configured to direct a plurality of excitation laser pulses onto a sample 105. In some embodiments, the light source 120 is pulsed at a frequency of 20 MHz to 100 MHz, 40 MHz to 80 MHz, 20 MHz to 60 MHz, 60 MHz to 100 MHz, about 40 MHz, about 80 MHz, or any suitable frequency or combination thereof. In some embodiments, the light pulse width is 1 fs to 500 ns, or any other suitable pulse width or combination thereof. In some embodiments, the light source 120 is a continuous wave (CW) laser, a pulsed single wavelength or tunable laser, a supercontinuum laser, a femtosecond laser, or any suitable light source of wavelengths in the UV, visible to infrared spectrum. In some embodiments, the wavelength of the light is in the range of 470 nm to 920 nm.

The FLIM system 110 can further include at least one FLIM photo detector 125 configured to detect emitted fluorescent photons created by the light interacting with the sample 105. The FLIM photo detector 125 can be a photo detector such as a hybrid photomultiplier tube (PMT), a photon-counting avalanche photodiode (APD), a silicon photomultiplier (SiPM), or similar detector, or any combination thereof. Additionally, the FLIM system 110 can include a FLIM data acquisition system 115 configured to measure the time interval between the excitation light pulses from at least one excitation source and the detected emitted fluorescent photons from at least one detector.

The SLM system 130 can include a fast scanning mirror 135 and a slow scanning mirror 140, wherein the mirrors are configured to scan the light from light source 120 across the sample. In some embodiments, the light source 120 comprises a laser, a LED, a laser diode, a super-luminescent diode, or any other suitable light source, or combination thereof. The SLM system 130 can further include at least one SLM photo detector 150 configured to detect reflectance photons from the sample 105. The SLM system 130 can further include at least one SLM photo detector 150 configured to detect fluorescence photons from the sample 105. The SLM photo detector 150 can be a photo detector such as a photomultiplier tube (PMT), a photon-counting PMT, a hybrid PMT, an avalanche photodiode (APD), a photon-counting avalanche photodiode (APD), a silicon photomultiplier (SiPM), or similar detector known in the art, or any combination thereof. Additionally, the SLM system 130 can include a SLM data acquisition system 145 configured to measure the reflectance photons synchronized with the positions of the fast mirror 135 and slow mirror 140. Additionally, the SLM system 130 can include a SLM data acquisition system 145 configured to measure the fluorescence photons synchronized with the positions of the fast mirror 135 and the slow mirror 140. In some embodiments, the SLM system 130 includes an FPGA or other configurable timing and/or triggering circuit configured to provide at least one synchronization trigger that is sent to the FLIM system 110.

In some embodiments, the SLM system can optionally include a second light source 155 configured to direct excitation light onto the sample 105. In some embodiments, the second light source 155 can be configured to direct a plurality of excitation light pulses onto the sample 105. In some embodiments, the second light source 155 is a pulsed laser. In some embodiments, the second light source 155 is a CW laser. In some embodiments, the second light source 155 provides light of an identical wavelength to the FLIM system 110 light source 120. In some embodiments, the second light source 155 provides light of a different wavelength compared to the FLIM system 110 light source 120. In some embodiments, the second light source 155 is a continuous laser with a central wavelength in the visible band and near infrared band. In some embodiments, the second light source 155 is a broadband super luminescent diode (SLD) with a central wavelength in the visible band and near infrared band and bandwidth of 10 nm to 100 nm. In some embodiments, the second light source 155 is a supercontinuum laser with tunable wavelengths spanning the visible bandwidth and near infrared (NIR) bandwidth. In some embodiments, the light source 155 is pulsed at a frequency of 20 MHz to 100 MHz, 40 MHz to 80 MHz, 20 MHz to 60 MHz, 60 MHz to 100 MHz, about 40 MHz, about 80 MHz, or any suitable frequency or combination thereof. In some embodiments, the light pulse width is 1 fs to 500 ns, or any other suitable pulse width or combination thereof.

The sample 105 can be any suitable sample material for FLIM and/or SLM imaging, for example, a biological sample material such as the tissue of a retina. In some embodiments, the sample is an in vivo sample. In some embodiments, the sample 105 can be in vivo, ex vivo, and/or in vitro. Some example samples 105 include anterior eye, brain, tissue, muscle, dermis, ear dermis, C. Elegens, cell cultures, stem cells in a scaffold, or any biological or non-biological samples that have fluorescent properties. Fluorescence may be from intrinsic or extrinsic fluorophores. In some embodiments, the sample 105 may be moving and/or require fast scanning.

In some embodiments, the SLM system 130 is configured as a scanning light ophthalmoscopy (SLO) system. In some embodiments, the SLM system 130 is configured as an adaptive optics scanning light ophthalmoscopy (AOSLO) system. In some embodiments, the SLM system 130 is configured as a confocal microscopy (CM) system. In some embodiments, the SLM system 130 is configured as at least one of a SLO system, an AOSLO system, a CM system, a two-photon microscopy system, a multi-photon microscopy system, a phosphorescence imaging system, and any other suitable microscopy system or combination thereof.

The data processing system 160 is communicatively connected to the FLIM system 110 and the SLM system 130, and can include a processor and a non-transitory computer-readable medium with instructions stored thereon, that when executed by the processor, performs steps comprising receiving data signals from the FLIM and SLM data acquisition systems (115, 145), creating SLM reflectance images from the SLM data signals, choosing a reference image from the SLM reflectance images, spatially aligning the SLM reflectance images to the SLM reference image, creating FLIM intensity images and fluorescent lifetime data (photon arrival time) from the FLIM data signals, dynamically optimizing an optical pinhole location and imaging focal plane of the FLIM signals by using real-time FLIM intensity signals to achieve a maximum FLIM photon flux rate and an optimized FLIM image contrast, and spatially aligning the FLIM intensity images to the spatially aligned SLM reflectance images. In some embodiments, the data processing system 160 can include a computing system 700 as further described in FIG. 7.

In some embodiments, the step of spatial aligning the FLIM intensity images, fluorescence lifetime signals, and the SLM reflectance images comprises correcting for sample movement. In some embodiments the FLIM and SLM data signals are acquired simultaneously. By aligning images from the FLIM system 110 to images from the SLM system 130 in the microscopy imaging system 100, the FLIM system 110 can achieve a cellular level resolution. In some embodiments, the FLIM images and the SLM images are stored as a video file. In some embodiments, the spatial alignment of the SLM images and the FLIM intensity images (FLIM fluorescence lifetime signals) to the SLM reference image is known as registration and co-registration, respectively.

In some embodiments, the data processing system 160 can further perform the steps of calculating transverse chromatic aberration (TCA) between the spatially aligned FLIM intensity images and SLM reflectance images, compensating for TCA variation encoded in the FLIM intensity and fluorescence lifetime images, receiving timing marks from the SLM data acquisition system 145 based on when the SLM data acquisition system 145 starts and stops recording, removing FLIM data signals outside of a timing window described by the timing marks, and removing scan image distortion from the data signals. The TCA can be a result of the FLIM light source 120 and the SLM light source 155 having different wavelengths, and the variation of pupil position during data acquisition. Exemplary details for the compensation of TCA from an SLO/AOSLO system has been described in U.S. Pat. No. 10,092,181, incorporated herein by reference in its entirety. In some embodiments, TCA compensation is ignored due to minimal variation of pupil position or under the situation of monochromatic imaging. In some embodiments, the timing marks include the time when the SLM system 130 starts data signal recording, the time when the SLM system 130 stop data signal recording, a periodic time of a frame synchronization clock of the SLM system 130, a periodic time of a line synchronization clock of the SLM system 130, and the time of a pixel clock of the SLM system 130. In some embodiments, multiple timing marks are recorded in one recording session.

In some embodiments, the reference image is a composite image. In some embodiments, the fast scanning mirror 135 is a fast-resonant scanning mirror, and the slow scanning mirror 140 is a slow linear scanning mirror. In some embodiments, the fast scanning mirror 135 is a fast polygon scanning mirror, and the slow scanning mirror 140 is a slow linear scanning mirror. In some embodiments, the fast scanning mirror 135 is configured to scan the light across the sample at a rate between 1 kHz to 100 kHz, 4 kHz to 32 kHz, about 4 kHz, about 16 kHz, about 32 kHz, or any other suitable rate or combination thereof. In some embodiments, the slow scanning mirror 140 is configured to scan the excitation light across the sample at a rate between 1 Hz to 100 Hz, 5 Hz to 100 Hz, about 5 Hz, about 50 Hz, about 100 Hz, or any other suitable rate or combination thereof. In some embodiments, the scanning motions of the fast and slow scanning mirrors (135, 140) are synchronized and/or phase locked.

In some embodiments, compensation of nonlinear image distortion and sample motion encoded in FLIM data with information from the SLM data is performed. In some embodiments, spatial mapping of FLIM images to SLM images is performed at a sub-micron precision.

Figure 2:
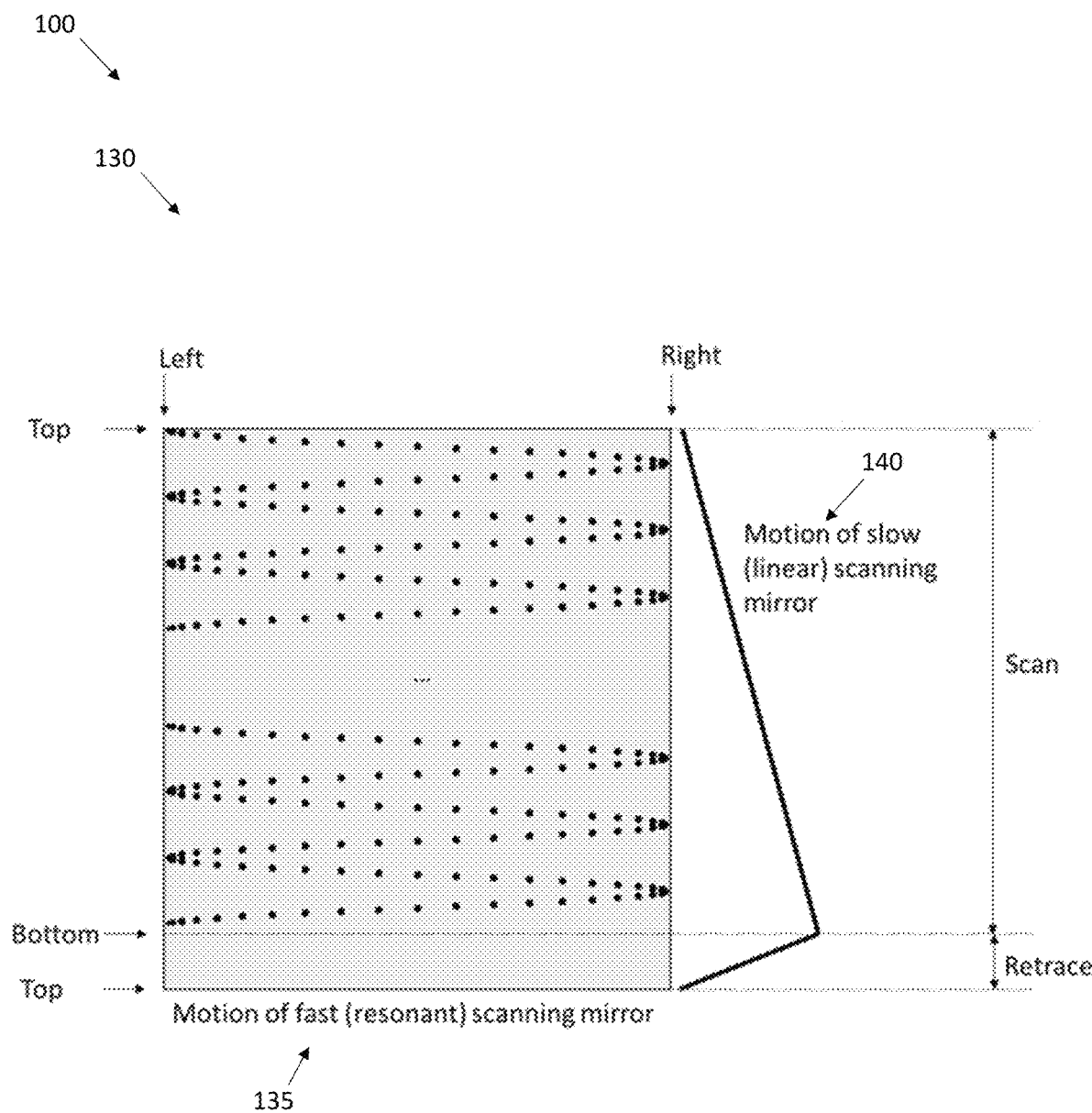
FIG. 2 is a diagram showing additional details of a SLM system of the microscopy imaging system in accordance with some embodiments.

FIG. 2 is a diagram illustrating how the SLM system 130 fast mirror 135 and slow mirror 140 can dynamically deliver a focused light pulse to a sample 105 in two-dimensional space. As illustrated in the figure, the light pulse is projected onto the two scanning mirrors (135, 140) as is relayed to and focused on the sample 105 in a single spot. The fast scanning mirror 135 steers the focused spot periodically in a horizontal direction with a sinusoidal motion at resonant frequency. In some embodiments, the fast scanning mirror 135 is configured to scan the excitation light pulses across the sample at a rate between 1 kHz and 100 kHz. The fast scanning mirror 135 can also be referred to as the resonant scanning mirror. In a full cycle of sinusoidal motion, the fast scanning mirror 135 travels one exact round trip from left to right, also known as a forward scan, and from right to left, also known as a backward scan. Any suitable fast scanning mirror 135 can be used for engineering implementation, such as models SC21/25/30 resonant scanners from Electro-Optical Products Corp (EOPC, Fresh Meadows, NY), models CRS4k/CRS8k/CRS12k resonant scanners from Cambridge Technology Inc. (Bedford, MA), and other resonant scanners.

The spacing of any two consecutive spots (from left to right or from right to left) has the same timing interval, while it encodes non-uniform spatial interval because the fast scanning mirror 135 travels faster in the center of the sample 105 and slows down close to the two edges to turn around, in a sinusoidal way.

At the end of a full cycle of resonant scan, a scanner driver will output a clock phase locked to physical motion of the fast scanning mirror 135. It is usually defined as "H-sync" (or line clock), which will be used to drive other devices such as a frame grabber for data acquisition. In some embodiments, H-sync is defined and used as the "Master Clock". All other clocks such as frame clock (or V-sync) and pixel clock (or data clock) are phased locked from this H-sync Master Clock.

The slow scanning mirror 140 steers the light pulse linearly at a much slower rate in a vertical direction from top to bottom as illustrated in FIG. 2. In some embodiments, the slow scanning mirror 140 is configured to scan the excitation light pulses across the sample at a rate between 1 Hz and 100 Hz. A Phase-Lock-Loop (PLL) is usually implemented to move the slow scanning mirror 140 one step down after exactly one full cycle of the fast scanning mirror 135. In some embodiments, this step size is programmable. Any suitable slow scanning mirror 140 can be used for implementation such as models 6210H/6215H/6220H galvo scanners from Cambridge Technology Inc. (Bedford, MA), and models S-335.2SHM1/S-334-2SL tip/tilt mirrors from Physik Instrumente (Karlsruhe, Germany). The slow scanning mirror 140 repeats this linear motion until it hits a "Bottom" location as illustrated in FIG. 2 at which point the slow scanning mirror 140 quickly moves back (retraces) to the start point illustrated as "Top" for the next cycle of slow scan. In some embodiments, the slow scanning mirror 140 can stack target motion such as dynamic motion of a living eye on the ramp signal shown in FIG. 2, to optically track target motion.

The slow scanning mirror 140 repeats the periodic cycle of "Scan" and "Retrace". At the end of a full cycle, an associated electronic driver outputs a clock defined as frame clock or V-sync phased locked to its physical motion. Because of phase locking described above, the V-sync is phase locked to H-sync. By defining the "Scan" portion and "Retrace" portion have M and N cycles of fast scan, respectively, frequency of the V-sync $f_V$ can be calculated as:

$$f_V = \frac{f_H}{M + N} \quad (1)$$

where $f_H$ is the frequency of H-sync, or frequency of the resonant/fast scanning mirror 135. M and N are non-negative integers and are programmable to balance multiple parameters such as inertia of the scanning mirror and desired field of view (FOV) and resolution of a scanning imaging system 130. Any suitable electronics such as a Field Programmable Gate Array (FPGA), for example a Virtex-5/6/7 from Xilinx Inc. (San Jose, CA), or a Digital Signal Processor (DSP), for example a TMS320C6652 from Texas Instruments (Dallas, Texas) can be used for programming M and N.

In a full cycle of V-sync, the combination of the fast scanning mirror 134 and the slow scanning mirror 140 will steer the focused light beam to the entire scan area, denoted by the gray shading, of the sample 105. In the next cycle of V-sync, the two scanning mirrors (135, 140) will repeat the same procedure, and this process will keep repeating until it is terminated. In one cycle of V-sync or frame clock, the SLM system 130 of the microscopy system 100 will scan (M+N) lines.

In some embodiments, a pixel clock with uniform timing interval, for example $f_p$=27.53 MHz, encodes a spatial sinusoidal distortion on the images acquired by both the FLIM system 110 and the SLM system 130. This distortion must be compensated for to achieve a uniform spatial interval which is more meaningful for data interpretation. Exemplary details for the compensation of the sinusoidal distortion in data from an SLO/AOSLO system has been described in Yang et al., Optics Letters, Vol. 40, Issue 1, pp. 85-88, 2015 and U.S. Pat. No. 9,485,383, each of which is incorporated herein by reference in their entirety. In some embodiments, sinusoidal distortion is pre-calibrated from the SLM system 130 with calibration grids, gratings, and/or any suitable tool, and a lookup table and/or a conversion matrix is generated to compensate for sinusoidal distortion in real time and/or post processing.

To accomplish the microscopy imaging as described above, a typical approach in some embodiments is to send scanning clock signals, and the photon signals simultaneously to the data acquisition systems (115, 145) and/or the data processing system 160. In some embodiments, the data acquisition systems (115, 145) and the data processing system 160, collectively referred to as the data systems (115, 145, 160), can include a frame grabber. For example, the frame grabber used can be an A/D chip AD9984a from Analog Devices Inc. (Norwood, MA) for digitization, integrated in a Xilinx Virtex-6 FPGA acting as the central controller of the SLM system 130. The data systems (115, 145, 160) can utilize the input synchronization signals to place the photon signals into timing "bins" which are mapped to individual positions of the focused light beam on the sample 105, thus constructing a frame of an image of the sample 105 that has been exposed by the scanning focused light beam when the binned data is combined.

In some embodiments, the motions of the scanning mirrors (135, 140) are continuous, but the sample images from data systems (115, 145, 160) are digitized due to A/D digitization or photon counting. For example, in one embodiment, once (M+N) is fixed, Equation (1) defines the number of lines per frame, usually defined as the "Image Height". In the horizontal direction the digitizers of the data systems (115, 145, 160) have a freedom to generate an arbitrary number of pixels per line, defined as "Image Width". A frame grabber of the data systems (115, 145, 160) can integrate another PLL to 'chop' the photon signals in K sections per H-sync in the form of:

$$f_p = f_H \times K \tag{2}$$

where K is programmable, $f_H$ is the frequency of the fast scanner, and $f_p$ is frequency of the pixel clock of the SLM system 130. In some embodiments, K is programmable through the second PLL. For example, in some embodiments, K can be set to 2500 to have $f_p$=34.34 MHz. Additionally, the first PLL (see Equation (1)) can be modified to increase/decrease (M+N) in order to decrease/increase frame rate of the imaging system.

Current off the shelf FLIM systems 110, such as a TCSPC, do not allow hardware pixel-level synchronization between the FLIM system 110 and the SLM system 130. The pixel clock of SLM system 130 is too fast for an off the shelf FLIM system 110 (TCSPC) to be able to accept it. Thus, the hardware synchronization is limited to the level of H-sync and V-sync only. When the systems (110, 130) acquire their own images simultaneously from the optical system, these two images are aligned at frame level and line level. For example, they have the same frame rate and the same number of lines per frame. However, the images have a different number of pixels per line, or the number K in Equation (2). In one embodiment, K is 2000 in the SLM system 130 (SLO or AOSLO), while provided analysis tools integrate data so that the smallest time bin is about 100n sin the FLIM system 110 (TCSPC).

The definition of a 'horizontal direction' and a 'vertical direction' in FIG. 2 is arbitrary, and it should be understood that one can rotate the scanning axes of the two scanning mirrors (135, 140) to any location in a 360° plane and/or reverse the directions of scans. Additionally, it should be understood that the two motion axes are orthogonal for convenience of data interpretation, but one can position the two motion axes at any angle. Additionally, in some embodiments, the motion of either the slow scanning mirror 140 or the fast scanning mirror 135 can be frozen to configure the system to operate in a single line-scan mode.

Furthermore, it should also be understood that N in Equation (1) can be any non-negative integer. For example, when N is 0, motion of the slow scanning mirror 140 is a sawtooth wave. When N=M, it turns into a triangular wave which can be applied to some slow scanning mirrors 140 with high inertia and high mechanical stability. The processing method will be identical in all three cases of a ramp signal, a sawtooth wave, and a triangular wave. The only difference with a triangular wave is that raw image sequence from individual data acquisition devices will be interleaved as 'odd' frames and 'even' frames which can be conveniently flipped over to all 'odd' or all 'even' orientation on hardware or software.

Also, it should be understood that the scanning mirrors are not limited to the periodic pattern as shown in FIG. 2. In some embodiments, the scanning mirrors (135, 140) are configured to move in the pattern of a point-of-interest where they can be programmed to scan only specific regions of the entire imaging field, for example, around an irregular biomarker on a biological sample. In another embodiment, the scanning mirrors (135, 140) are configured to move in a circular pattern, such as those in Optical Coherence Tomography where a scanning line rotates in a radial direction in 360° space. In another embodiment, the scanning mirrors (135, 140) are configured to move in a circular line pattern accompanying translational motion. In another embodiment, the scanning mirrors (135, 140) are configured to move in a circular point pattern with or without translational motion.

Figure 3:
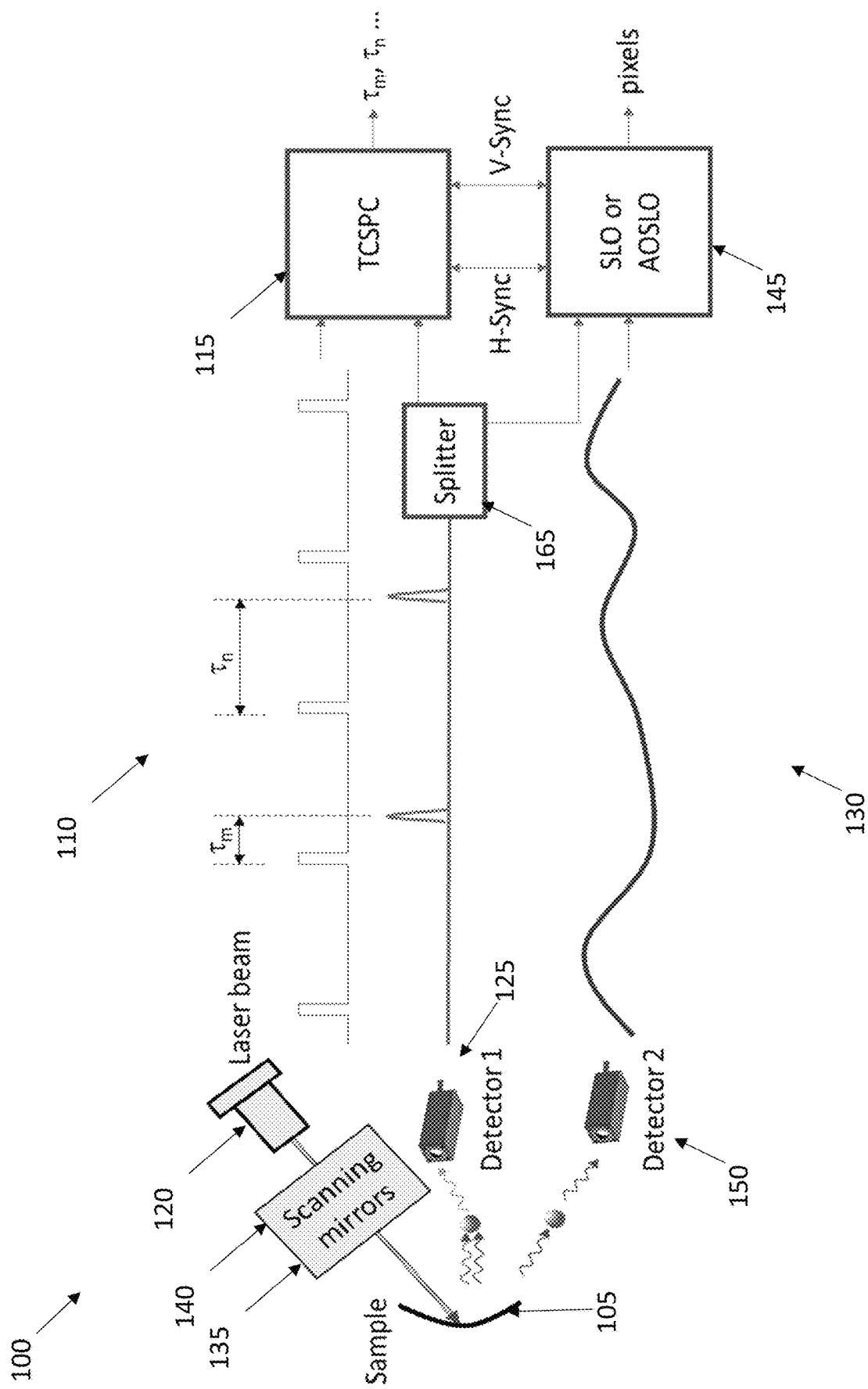
FIG. 3 is a diagram showing additional details of the microscopy imaging system in accordance with some embodiments.

FIG. 3 illustrates a simple diagram for an example integration of FLIM and SLM, where a FLIM system 110 including a FLIM data acquisition system 115, such as a TCSPC, is implemented for detection of photon arrival time in FLIM channel, and a SLM system 130 including a SLM data acquisition system 145 is configured as a SLO or AOSLO system. In one embodiment, the SLM system 130 is the model SPC-160 from Becker & Hickl GmbH. The diagrams illustrates asynchronous data acquisition between AOSLO and TCSPC in the AOFLIO system.

As illustrated in FIG. 3, fluorescence photons are created from a sample 105, such as a retina, excited by light pulses delivered via a light source 120 and scanning mirrors (135, 140). The fluorescence photons are detected by a FLIM photo detector 125, thus creating a FLIM data signal which is acquired by the FLIM data acquisition 115. Additionally, in some embodiments, the same fluorescence photons can be detected by a FLIM photo detector 125 connected to a signal splitter 165, thus creating a fluorescence intensity signal which can be acquired by the SLM data acquisition 145. In some embodiments, an optical splitter is utilized in place of the signal splitter 165. Additionally, high signal-to-noise (SNR) reflectance photons from a sample 105, such as a retina, are created by light pulses delivered via a light source 120 and scanning mirrors (135, 140). The reflectance photons are detected by a SLM photo detector 150, thus creating a SLM data signal which is acquired by the SLM data acquisition 145.

Additionally, information on the timing of the provided light pulses from the light source 120 is sent to the FLIM data acquisition system 115, which in turn measures the time interval between the excitation light pulses and fluorescence photons, such as $\tau_m$ and $\tau_n$ in FIG. 3. In some examples, $\tau_m$ and $\tau_n$ are denoted as photon arrival times.

In some embodiments, a single excitation light source 120 is used to excite the sample 105 for FLIM fluorescence signals and SLM reflectance signals. Alternatively, in some embodiments, multiple light sources (120, 155) for different optical channels can be utilized. For example, a first light source 120 is utilized for exciting fluorescence to acquire FLIM data and a second light source 155 is used for reflectance imaging. In some embodiments the light sources (120, 155) can be pulsed lasers. In some embodiments, the light sources (120, 155) are continuous wave (CW) lasers. In some embodiments, the light sources (120, 155) are at least one of a pulsed laser, a CW laser, or any other suitable laser or combination thereof.

In the example application of FIG. 3, AOSLO reflectance images can be used to align FLIM intensity images and FLIM fluorescence lifetime signals to the same retinal locations as measured by the AOSLO. Closed-loop optical tracking technologies can be implemented to lock imaging beams to desired retinal locations, and fluorescence signals are integrated in real time. Exemplary details of these methods have been described in U.S. Pat. Nos. 9,226,656, 9,406,133, and U.S. Ser. No. 10/092,181, each of which is incorporated herein by reference in their entirety.

In some embodiments, the light source(s) (120, 155) for the FLIM system 110 and SLM system 130 travel through the same optical path and are scanned by the same fast scanning mirror 135 and the slow scanning mirror 140. Thus, in some embodiments, the data acquisition systems (115, 145) are synchronized at all three levels of V-sync, H-sync, and pixel clock, where both data acquisition systems (115, 145) can output two images mapping exactly the same scanner space.

In some embodiments, the photo detectors (125, 150) are point photodetectors such as an avalanche photodiode (APD), a photomultiplier tube (PMT), a silicon photomultiplier (SiPM), or any other suitable photo detector or combination thereof. The photo detectors (125, 150) are installed on a detection optical path to receive excited photons from the sample 105. The excited photons could be fluorescence photons, reflectance photons, phosphorescence photons, or any other suitable photons or combinations thereof. The photo detectors (125, 150) continuously output one-dimensional photon signals (photon signal vs. time) which are then acquired by the data acquisition systems (115, 145). In some embodiments, the data acquisition systems (115, 145) can be a fast A/D chip, a photon counting device, or other suitable device or combination thereof. In some embodiments, a signal splitter 165 can be used to split the source FLIM data signal, with one relaying to SLO/AOSLO 145 and the other relaying to the TCSPC 115.

Figure 4:
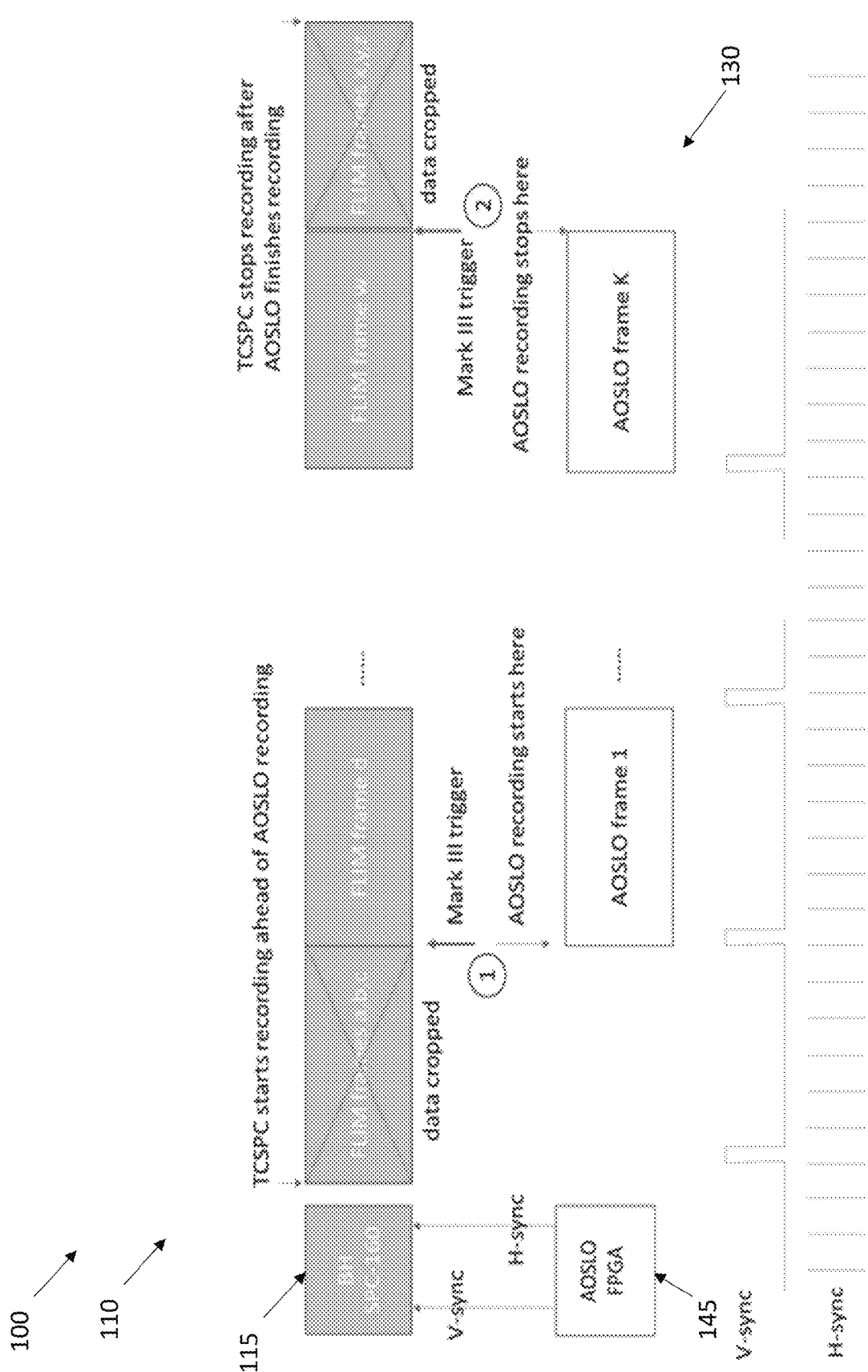
FIG. 4 is a diagram showing timing details of the microscopy imaging system in accordance with some embodiments.

FIG. 4 is a diagram illustrating data flow control between the FLIM system 110 and the SLM system 130 of the microscopy system 100. The FLIM system 110 includes a FLIM data acquisition system 115, such as a BH SPC-160, for example. The SLM system 130 includes a SLM data acquisition system 145, such as an AOSLO, for example. As shown in FIG. 4, the SLM data acquisition system 145 sends out H-sync and V-sync to the FLIM data acquisition system 115 for the formation of a frame of a FLIM image. H-sync and V-sync are hardware synchronization signals from a FPGA, such as a Xilinx, a Spartan-7, a Virtex-7, a Virtex-6, or a Virtex-5, for example. These are the same H-sync and V-sync sent to an SLM frame grabber for data acquisition. The FLIM data acquisition system 115 starts data recording before the SLM data acquisition system 145 starts data recording. At timing location 1, the SLM data acquisition system 145 starts data recording and the FPGA of the SLM system 130 sends out the first trigger signal (or the first "Mark III trigger" on FIG. 4), to notify the FLIM data acquisition system 115 that SLM data acquisition system 145 starts data recording at this moment. This first "Mark III trigger" signal is phase locked to the rising edge or falling edge of the V-sync with pulse duration in an integer number of H-sync, a hardware pulse generated by the FPGA. Both data acquisition systems (115, 145) keep recording data until the SLM data acquisition system 145 stops recording manually or automatically at timing location 2.

At the moment when the SLM data acquisition system 145 stops recording, the FPGA on the SLM data acquisition system 145 sends out the second trigger signal (or the second "Mark III trigger" on FIG. 4) to notify the FLIM data acquisition system 115 that SLM data acquisition system 145 stops data recording at this moment. This second "Mark III trigger" signal is also phase locked to the rising edge or falling edge of the V-sync with pulse duration in integer number of H-sync, a hardware pulse generated by the FPGA. The FLIM data acquisition system 115 stops recording after the SLM data acquisition system 145 stops recording.

In some embodiments the events to trigger start/stop recordings of data acquisition systems (115, 145) can be manual, and in other embodiments the start/stop recordings can also be controlled by an imaging software automatically. The FLIM data acquisition system 115 consistently records more data than the SLM data acquisition system 145 does, but any FLIM data beyond the range of these two Capture-sync (Mark III) triggers is discarded. Within the two Capture-sync triggers, the data acquisition systems (115, 145) will have frame-to-frame mapping information because of the H-sync and V-sync, but the pixel information from FLIM data acquisition system 115 is unknown since FLIM data acquisition system 115 uses its internal pixel clock when it forms a frame of an FLIM image. In addition to outputting an integrated FLIM image, the FLIM data acquisition system 115 can also store raw timing signals from its photo detector 125. Each timing signal records two parameters for a fluorescence photon that has been detected. The signals can be encoded as a packet in a data stream with a unique signal identifier signifying the signal type and event timestamps. In addition to the type and event information, photon detection packets can be encoded within the byte stream with the photon arrival time which is the time interval between the excitation pulse and the emitted photon pulse.

Figure 5:
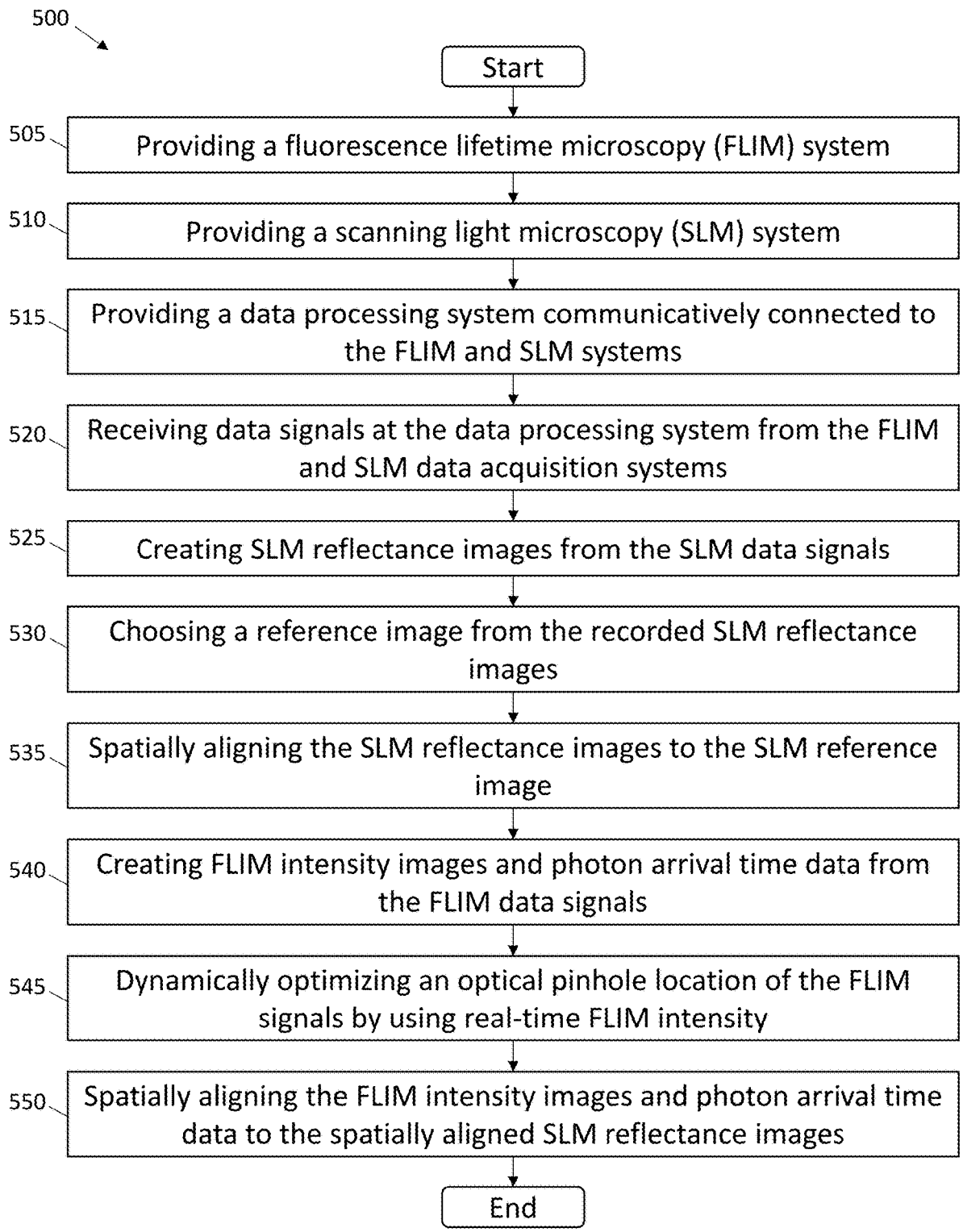
FIG. 5 is a flow chart showing a microscopy imaging method in accordance with some embodiments.

FIG. 5 is a flow chart showing a microscopy imaging method 500 in accordance with some embodiments. The method 500 begins at Operation 505, where a fluorescence lifetime imaging microscopy (FLIM) system 110 is provided. The FLIM system 110 can include a pulsed light source 120 configured to direct a plurality of excitation light pulses onto a sample 105, a FLIM photo detector 125 configured to detect emitted fluorescent photons created by the plurality of excitation pulses interacting with the sample 105, and a FLIM data acquisition system 115 configured to measure the time interval between the excitation light pulses and the detected emitted fluorescent photons.

At Operation 510 a scanning light microscopy (SLM) system 130 is provided. The SLM system 130 includes a SLM data acquisition system 145, a fast scanning mirror 135 and a slow scanning mirror 140, wherein the mirrors (135, 140) are configured to scan the light pulses across the sample 105, and a SLM photo detector 150 configured to detect reflectance photons from the sample 105. In some embodiments, the SLM system 130 detects a FLIM intensity signal simultaneously via a signal splitter 165 as shown in FIG. 3. In some embodiments, no signal splitter is used, and the FLIM data signal goes directly from FLIM detector 125 to the TCSPC 115.

At Operation 515 a data processing system 160 communicatively connected to the FLIM system 110 and SLM 130 system is provided. At Operation 520 data signals are received at the data processing system 160 from the FLIM system 110 and SLM 130 system. At Operation 525 SLM reflectance images are created from the SLM data signals. At Operation 530 a reference image is chosen from the recorded SLM reflectance images. At Operation 535 the SLO reflectance images are spatially aligned to the SLM reference image, and the FLIM intensity images acquired by SLO are spatially co-aligned to the SLM reference image with TCA compensation, and TCA compensated motions are used to co-align FLIM fluorescence lifetime data signals. At Operation 540 FLIM intensity images and photon arrival time data are created from the FLIM data signals. At Operation 545 an optical pinhole location and imaging focal plane of the FLIM signals are dynamically optimized in the SLO by using real-time FLIM intensity signals to achieve a maximum FLIM photon flux rate and an optimized FLIM image contrast. In some embodiments, the FLIM intensity signals are split via the signal splitter 165. In some embodiments, no optimization of the optical pinhole location is executed. The method 500 ends at Operation 550, where the FLIM fluorescent lifetime data are spatially aligned to the spatially aligned SLM reflectance images with TCA compensated sample motion from the step of co-alignment of FLIM intensity images to SLO reflectance reference image.

In one embodiment, the method 500 further comprises acquiring data signals via the FLIM system 110 and SLM system 130 simultaneously. In one embodiment, the method 500 further comprises removing scan image distortion from the data signals. In one embodiment, the distortion removed from the scanning system is sinusoidal distortion encoded by the fast mirror 135 and slow mirror 140 of the SLM system 130. In one embodiment, the method 500 further comprises generating a look up table to remove the sinusoidal distortion. In one embodiment, the method 500 further comprises aligning forward scan data signals in a first data region and backward scan data signals in a second region of the data signals. In one embodiment, the method 500 further comprises mirroring the identified backward scan data signals and averaging the mirrored backward scan data signals with the forward scan data signals to increase the signal to noise ratio. In one embodiment, the method 500 further comprises cropping data signals from the time that the scanning mirrors (135, 140) are retracting. In one embodiment, the method 500 further comprises co-registering the data signals post processing via a frame or strip level motion calculation to improve resolution by accounting for finer sample movement.

In one embodiment, the SLM system 130 comprises a scanning light ophthalmoscopy (SLO) system. In one embodiment, the SLM system 130 comprises an adaptive optics scanning light ophthalmoscopy (AOSLO) system. In one embodiment, the sample 105 is an in vivo sample. In one embodiment, the sample 105 is a retina. In one embodiment, the sample 105 is an in vivo retina.

In one embodiment, the method 500 further comprises sending at least one synchronization trigger signal from the SLM system 130 to the FLIM system 110. In one embodiment, the at least one synchronization trigger signal is provided by an FPGA.

Figure 6:
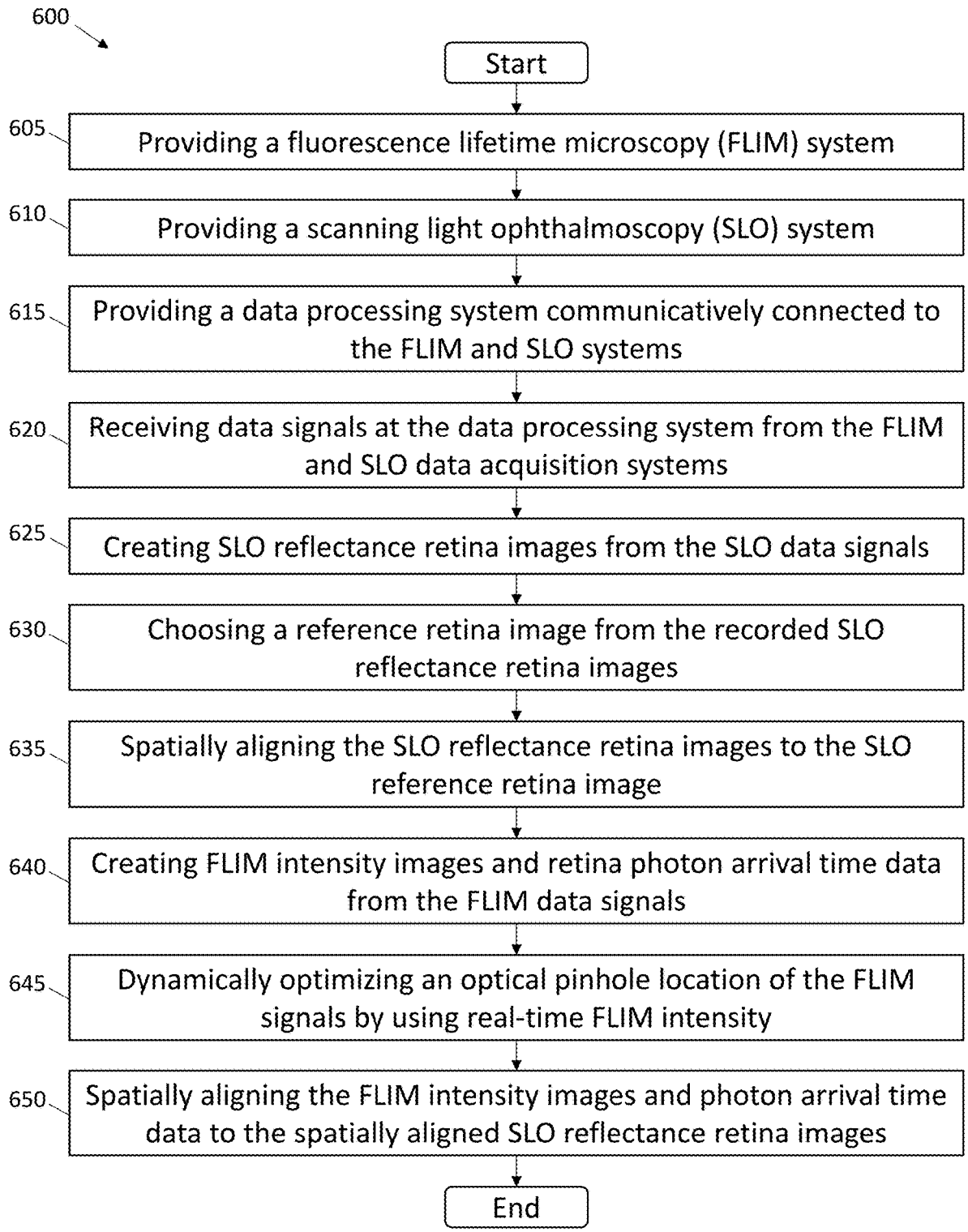
FIG. 6 is a flow chart showing a method for in vivo retinal microscopy imaging in accordance with some embodiments.

FIG. 6 is a flow chart showing a method 600 for in vivo retinal microscopy imaging in accordance with some embodiments. The method 600 begins at Operation 605, where a fluorescence lifetime imaging microscopy (FLIM) system 110 is provided. The FLIM system 110 can include a pulsed light source 120 configured to direct a plurality of excitation light pulses onto a retina sample 105, a FLIM photo detector 125 configured to detect emitted fluorescent photons created by the plurality of excitation pulses interacting with the retina sample 105, and a FLIM data acquisition system 115 configured to measure the time interval between the excitation light pulses and the detected emitted fluorescent photons.

At Operation 610 a scanning light microscopy (SLM) system 130 configured as a scanning light ophthalmoscopy (SLO) system is provided. The SLO system includes a SLO data acquisition system 145, a fast scanning mirror 135 and a slow scanning mirror 140, wherein the mirrors (135, 140) are configured to scan the light pulses across the retina sample 105, and a SLO photo detector 150 configured to detect reflectance photons from the retina sample 105.

At Operation 615 a data processing system 160 communicatively connected to the FLIM system 110 and SLO 130 system is provided. At Operation 620 data signals are received at the data processing system 160 from the FLIM system 110 and SLO system 130. At Operation 625 SLO reflectance retina images are created from the SLO data signals, and FLIM intensity images are created in the SLO system 130 via signals from the signal splitter 165. In some embodiments, no signal splitter is used, and the FLIM data signal goes directly from the FLIM detector 125 to TCSPC 115. At Operation 630 a reference retina image is chosen from the recorded SLO reflectance retina images. At Operation 635 the SLO reflectance retina images are spatially aligned to the SLO reference retina image, the FLIM intensity images are spatially co-aligned to the SLO reference retina image with TCA compensation, and TCA compensated motions are used to co-align the FLIM fluorescence lifetime data signals. In some embodiments, the FLIM data signals do not require co-registration. In some embodiments, the FLIM data signals do not require TCA compensation. At Operation 640 FLIM fluorescent lifetime retina data are created from the FLIM data signals. At Operation 645 an optical pinhole location and imaging focal plane of the FLIM signals is dynamically optimized in the SLO by using real-time FLIM intensity signals provided via the splitter to achieve a maximum FLIM photon flux rate and an optimized FLIM image contrast. In some embodiments, the signal splitter 165 is not used, and optimization of optical pinhole location is not executed. The method 600 ends at Operation 650, where the FLIM fluorescent lifetime retina data are spatially aligned to the spatially aligned SLO reflectance retina images with TCA compensated sample motion from the step of co-alignment of the FLIM intensity images to the SLO reflectance reference image. In some embodiments, TCA compensation is not executed.

In some aspects of the present invention, software executing the instructions provided herein may be stored on a non-transitory computer-readable medium, wherein the software performs some or all of the steps of the present invention when executed on a processor.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C#, Objective-C, Java, JavaScript, MATLAB, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G, 4G/LTE, or 5G networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

Figure 7:
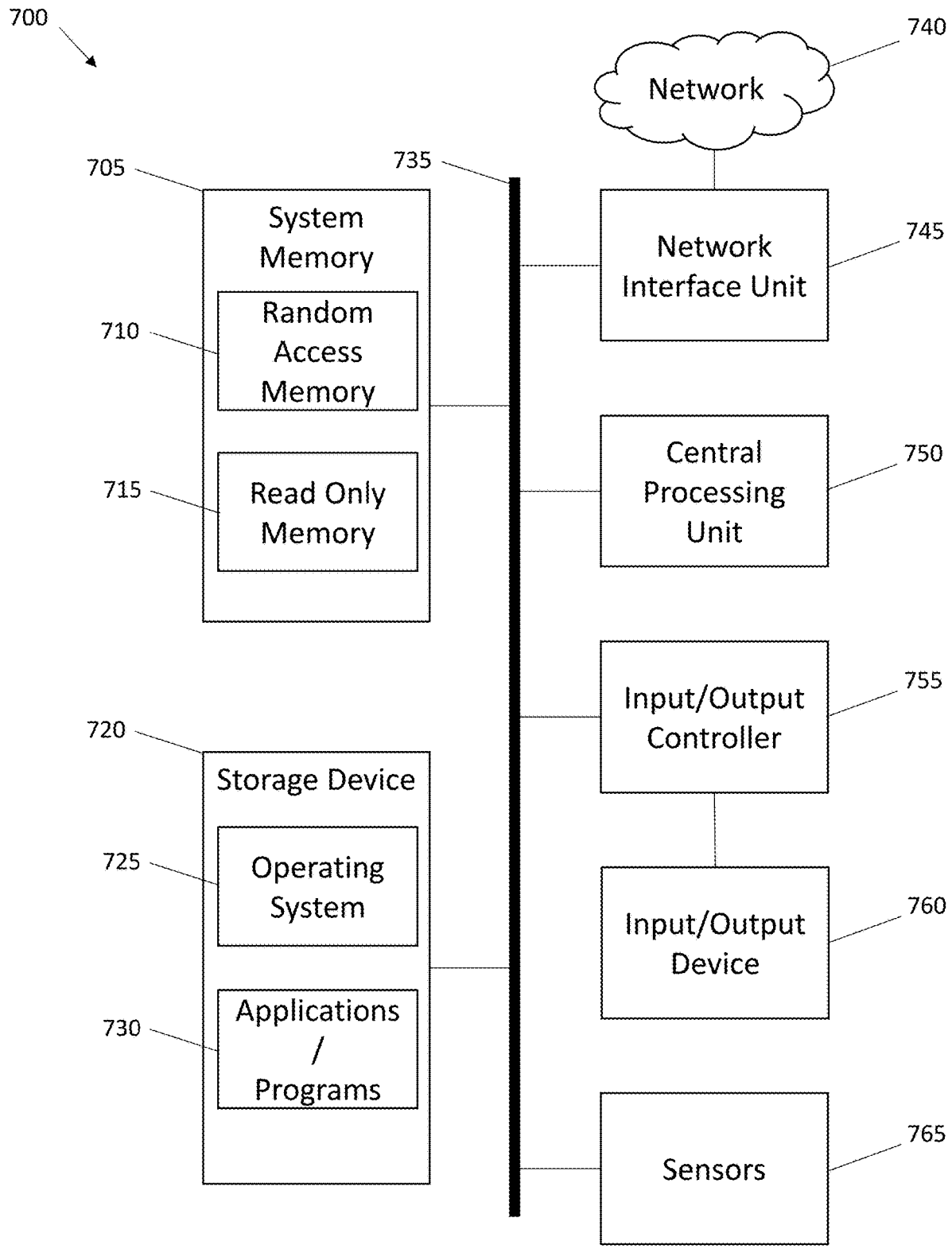
FIG. 7 is a block diagram showing an example computing system used to implement the microscopy imaging system in accordance with some embodiments.

FIG. 7 and the following discussion are intended to provide a brief, general description of a suitable computing environment in which the invention may be implemented. While the invention is described above in the general context of program modules that execute in conjunction with an application program that runs on an operating system on a computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 7 depicts an illustrative computer architecture for a computer 700 for practicing the various embodiments of the invention. The computer architecture shown in FIG. 7 illustrates a conventional personal computer, including a central processing unit 750 ("CPU"), a system memory 705, including a random-access memory 710 ("RAM") and a read-only memory ("ROM") 715, and a system bus 735 that couples the system memory 705 to the CPU 750. A basic input/output system containing the basic routines that help to transfer information between elements within the computer, such as during startup, is stored in the ROM 715. The computer 700 further includes a storage device 720 for storing an operating system 725, application/program 730, and data.

The storage device 720 is connected to the CPU 750 through a storage controller (not shown) connected to the bus 735. The storage device 720 and its associated computer-readable media, provide non-volatile storage for the computer 700. Although the description of computer-readable media contained herein refers to a storage device, such as a hard disk or CD-ROM drive, it should be appreciated by those skilled in the art that computer-readable media can be any available media that can be accessed by the computer 700.

By way of example, and not to be limiting, computer-readable media may comprise computer storage media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer 700 may operate in a networked environment using logical connections to remote computers through a network 740, such as TCP/IP network such as the Internet or an intranet. The computer 700 may connect to the network 740 through a network interface unit 745 connected to the bus 735. It should be appreciated that the network interface unit 745 may also be utilized to connect to other types of networks and remote computer systems.

The computer 700 may also include an input/output controller 755 for receiving and processing input from a number of input/output devices 760, including a keyboard, a mouse, a touchscreen, a camera, a microphone, a controller, a joystick, or other type of input device. Similarly, the input/output controller 755 may provide output to a display screen, a printer, a speaker, or other type of output device. The computer 700 can connect to the input/output device 760 via a wired connection including, but not limited to, fiber optic, ethernet, or copper wire or wireless means including, but not limited to, Bluetooth, Near-Field Communication (NFC), infrared, or other suitable wired or wireless connections.

As mentioned briefly above, a number of program modules and data files may be stored in the storage device 720 and RAM 710 of the computer 700, including an operating system 725 suitable for controlling the operation of a networked computer. The storage device 720 and RAM 710 may also store one or more applications/programs 730. In particular, the storage device 720 and RAM 710 may store an application/program 730 for providing a variety of functionalities to a user. For instance, the application/program 730 may comprise many types of programs such as a word processing application, a spreadsheet application, a desktop publishing application, a database application, a gaming application, internet browsing application, electronic mail application, messaging application, and the like. According to an embodiment of the present invention, the application/program 730 comprises a multiple functionality software application for providing word processing functionality, slide presentation functionality, spreadsheet functionality, database functionality and the like.

The computer 700 in some embodiments can include a variety of sensors 765 for monitoring the environment surrounding and the environment internal to the computer 700. These sensors 765 can include a Global Positioning System (GPS) sensor, a photosensitive sensor, a gyroscope, a magnetometer, thermometer, a proximity sensor, an accelerometer, a microphone, biometric sensor, barometer, humidity sensor, radiation sensor, or any other suitable sensor.

EXPERIMENTAL EXAMPLES

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples, therefore, specifically point out the preferred embodiments of the present invention and are not to be construed as limiting in any way the remainder of the disclosure.

It is widely known that SLM such as SLO/AOSLO has state-of-the-art optical resolution capitalizing on confocal microscopy for in in-vivo retinal imaging. With proper optical/electronic/software engineering, one can also conveniently collect live images from the retina in high signal-to-noise-ratio (SNR) reflectance signals and/or low SNR fluorescence signals concurrently. Simultaneous collection of live retinal images from multiple channels of reflectance channels and multiple channels of fluorescence channels have been achieved, and exemplary details have been described in Gray et al. Optics Express, 14(16), 7144-7158, 2006, and Sharma et al. Invest Ophthalmology and Visual Science, 57(2):647-57, 2016, each incorporated herein by reference in their entirety.

One motivation to integrate FLIM into existing AOSLO (or SLO) is to have the FLIM data channel also take all advantages of finer sampling, such as for cellular scale of AOSLO imaging, hence an integrated system will provide much more information than individual FLIM or individual AOSLO/SLO can provide for clinical and/or scientific applications. As described herein, in some embodiments, the integrated system 100 can be defined as Adaptive Optics Fluorescence Lifetime Ophthalmoscopy (AOFLIO).

Another reason for the integration of FLIM and AOSLO (or SLO) is that signal from FLIM channel is usually in very low SNR. It is required to integrate tens, hundreds or even thousands of frames (tens or even hundreds of seconds in time) of raw FLIM images to generate an interpretable fluorescent image. This is problematic in in-vivo retinal imaging because the eye is moving constantly and randomly. Without motion compensation, the integrated FLIM image will be blurred, and hence, is not able to provide sufficient information for clinical/scientific application. The integration of AOSLO/SLO allows the optical system to capture retinal motion dynamically, and these motions are then applied to FLIM images for motion compensation. This step is usually defined as "registration" or "co-registration".

The experimental data was obtained with a microscopy imaging system 100 including a SLM system 130 configured as an AOSLO system. The AOSLO had a fast scanning mirror 135 with resonant frequency 13.737 kHz ($f_H$), a slow scanning mirror 140 with 542(M)+3(N) lines per frame, and K=2000. Therefore, $f_V$=25.2 Hz (or frame per second) and $f_p$=27.53 MHz as described in Equation (1) and Equation (2).

Furthermore, AOFLIO images were collected using three different AOSLO instruments each designed for a specific species and purpose, see Sharma et al., In vivo two-photon imaging of the mouse retina. Biomed. Opt. Express 4, 1285-1293 (2013); Dubra et al., Non-invasive in vivo imaging of the human rod photoreceptor mosaic using a confocal adaptive optics scanning ophthalmoscope. Biomedical Optics Express, 2(7), 1864-1876 (2011); Zhang et al., An adaptive optics imaging system designed for clinical use: publisher's note. Biomed. Opt. Express 6, 2864-2864 (2015); and Sharma et al., In vivo Two-Photon Fluorescence Kinetics of Primate Rods and Cones. Invest Ophthalmol Vis Sci. 57(2):647-57 (2016); each of which is incorporated herein by reference in their entirety. In the human and monkey AOSLOs the retina was illuminated with a broadband 790440 nm super luminescent diode (SLD) (Broadlighter, Superlum, Cork, Ireland). Reflectance signals from the photoreceptor layer were used for navigating the retina, capturing eye motion and other applications. The mouse AOSLO performed reflectance imaging at 680 nm and is often focused in the inner retina. In the human system, AOFLIO excites lipofuscin of the retina with an 80 MHz pulsed supercontinuum laser at 532410 nm (pulse width 50 ps, SuperK Extreme FIU-15, NKT Photonics, Birkerod, DK). Single-photon excited fluorescence photons from the retinal pigment epithelium (RPE) layer are collected in the emission range 575-725 nm. In the animal systems, the two-photon fluorescence excitation was accomplished with a tunable femtosecond laser (710-920 nm, pulse width 55 fs, 80 MHz, MaiTai XF-1 with DeepSee; Spectra-Physics, Santa Clara, CA, USA). Fluorescence emission is collected in the range 380-550 nm. Using data collected in mice, monkeys and humans, the sinusoidal correction and motion registration described below is demonstrated.

AOSLO data was acquired from an FPGA-based circuitry, see Yang et al., Closed-loop optical stabilization and digital image registration in adaptive optics scanning light ophthalmoscopy, Biomedical Optics Express Vol. 5, Issue 9, pp. 3174-3191 (2014); Arathorn et al., Retinally stabilized cone-targeted stimulus delivery, Optics Express Vol. 15, Issue 21, pp. 13731-13744 (2007); Yang et al., Design of an integrated hardware interface for AOSLO image capture and cone-targeted stimulus delivery, Optics Express Vol. 18, Issue 17, pp. 17841-17858 (2010); and Joseph et al., Label-free imaging of immune cell dynamics in the living retina using adaptive optics, eLife 2020; each of which is incorporated herein by reference in their entirety.

AOFLIO lifetime data was recorded by a SPC160 TCSPC system (Becker & Hickl GmbH, Berlin, Germany), as illustrated in the diagram of FIG. 4. FPGA circuitry digitizes the two synchronization signals from the resonant scanner and the slow scanner to H-sync and V-sync, and generates a 35-40 MHz data clock phase-locked to the H-sync. The FPGA also sends these H-sync and V-sync to SPC160 for AOFLIO data acquisition. SPC160 can accept an external data clock, but the AOSLO clock (35-40 MHz) was too fast. Therefore, SPC160 uses its internal data clock which has a bandwidth of 12.5 MHz. In addition to H-sync and V-sync synchronization, AOSLO also outputs a pair of trigger signals defined as "Mark III" to SPC160, to indicate the start and end points of AOSLO data recording. "Mark III" triggers are phase locked to the falling edge (or rising edge dependent on individual implementation) of V-sync with pulse width in exact one full cycle of H-sync. From FIG. 3 it can be seen that AOSLO data recording is sandwiched between AOFLIO lifetime recording. Any AOFLIO data recorded out the range of these two "Mark III" triggers was cropped during post processing. As a result, AOSLO and AOFLIO was aligned at frame by frame and line by line, but not yet pixel by pixel which was implemented in the step of offline sinusoidal rectification described below.

Figure 9:
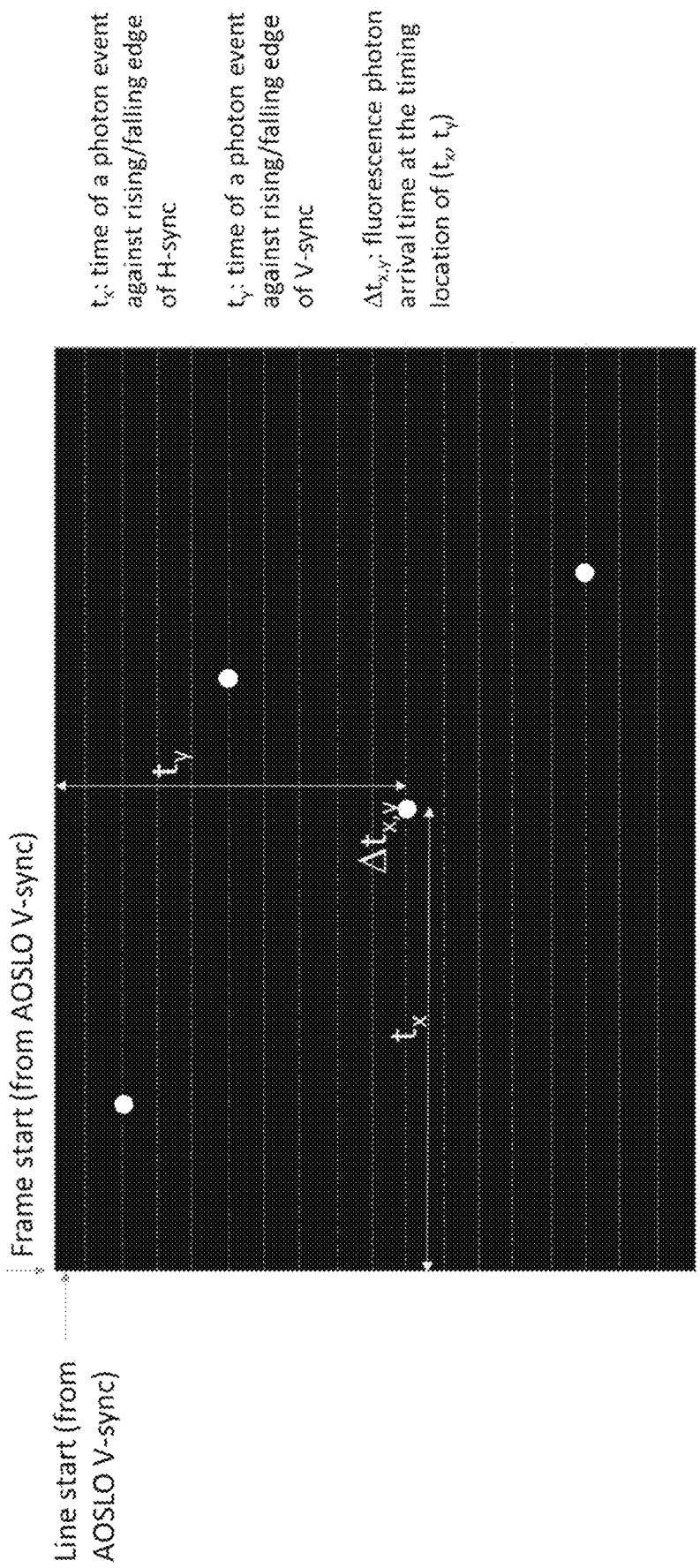
FIG. 9 shows example experimental data from the FLIM system of the microscopy imaging system in accordance with some embodiments.

It is widely known that AOSLO usually stores data frame by frame, line by line, and pixel by pixel in a video, regardless in uncompressed 8-bit AVI, 16-bit TIFF stack, or any other format. But SPC160 records lifetime data more sparsely due to low flux rate of fluorescence photons. FIG. 9 illustrates a data structure of SPC160 where data is recorded only when a photon (individual white dots) is detected. The step of offline sinusoidal rectification uses these timing data to reconstruct sparse fluorescence lifetime images frame by frame to be co-registered by AOSLO image motions.

To improve single photon fluorescence imaging efficiency and optimize photon counts, a custom splitter HPMCON-02 (Becker & Hickl GmbH, Berlin, Germany) was employed. HPMCON-02 has one input port to receive photon pulses from the hybrid PMT and two output ports. The first output port is to relay PMT photon pulses to SPC160 directly and the second output port converts the same photon pulse from the hybrid PMT into analog pulse with width in ~40 ns and amplitude in ~1.0 V. These analog pulses are sent to one data acquisition channel of the AOSLO as fluorescence intensity signals. This improvement allows one to recover all advanced fluorescence imaging functionalities such as optimal alignment of visible PMT pinhole position, DM focus for RPE imaging and dynamic visualized integration of fluorescence intensity capitalizing on real-time optical tracking and digital registration, see Granger et al., "Human retinal pigment epithelium: In vivo cell morphometry, multispectral autofluorescence, and relationship to cone mosaic," Investig. Ophthalmol. Vis. Sci. 59, 5705-5716 (2018), incorporated herein by reference in its entirety. From SPC160 software, it is typical to see photon rate increases 20%-30% after these optimizations.

FIG. 9 shows diagram of an example raw data format of the FLIM system 110, such as an SPC160, where the white dots illustrate photons detected and information stored. Every time a fluorescence photon is detected by the FLIM system 110, it will record the timing point when it is occurring. This timing point can be converted to $t_x$ and $t_y$, which are against the events of H-sync and V-sync respectively. At this timing location $(t_x, t_y)$, the FLIM system 110 records a second parameter $\Delta t_{x,y}$, the arrival time of this fluorescence photon, as illustrated in FIG. 3 as well. The FLIM system 110 does not record anything at the moments when no photon is detected, not necessarily no photon is occurring.

Offline sinusoidal rectification is shown in FIG. 9 to reshape AOFLIO raw timing data structure to AOSLO imaging (or scanner) space, so that the fluorescence photon arrival times $\Delta tx,y$ can be represented in the format of an 'image'. As a result, a fluorescence lifetime video is reconstructed which has the same image size (after sinusoidal rectification) and the same video length (from Mark III cropping as shown in FIG. 4) as the associated AOSLO video.

To align the raw data as illustrated in FIG. 9 to the SLM space, the raw FLIM data is sampled at the rate of the SLM pixel clock of the SLM system 130 post processing in software on the data processing system 160. The AOSLO utilized for the experimental imaging had a 27.53 MHz pixel clock, hence a period of 36.32 ns.

Figure 10A:
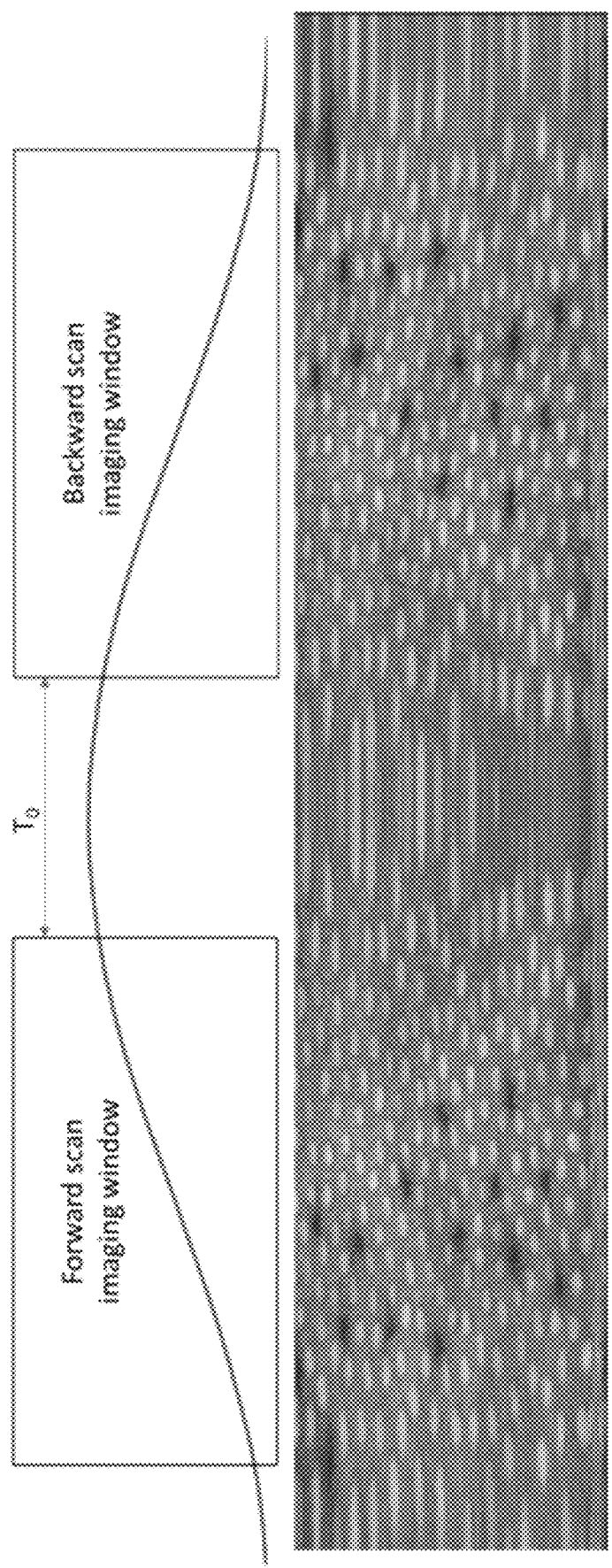
FIGS. 10A and 10B show example experimental FLIM images from the microscopy imaging system in accordance with some embodiments.

One example method is to reshape the raw data from the FLIM system 110 at the interval of 36.32 ns. FIG. 10A illustrates an example of a FLIM image sampled at the 36.32 ns uniform timing interval, where software on the data processing system 160 reads out all the raw data and integrates them. The image in FIG. 10A includes every single moment when the resonant/fast scanner travels forwards and backwards, and at the same time, the slow scanning mirror is moving quickly back to the original position after scanning a whole frame. The bottom portion of the image is highly compressed because the slow scanning mirror 140 is retracing. The center and two edges of the images shows highly stretched because the fast scanning mirror 135 is moving slowly and turning around. This horizontal distortion is caused by the sinusoidal motion of the fast scanning mirror 135 as illustrated in FIG. 2. To compensate for the sinusoidal distortion, a similar method as described in Yang et al., Optics Letters, Vol. 40, Issue 1, pp. 85-88, 2015 and U.S. Pat. No. 9,485,383, each of which is incorporated herein by reference in their entirety, was used. The method is illustrated in the top panel of FIG. 10A. In some embodiments, the sinusoidal distortion is pre-calibrated with a different method such as using a grid, a grating, or any suitable tool. A de-sinusoiding lookup table and/or a conversion matrix is then generated to compensate for sinusoidal distortion in real time or post processing.

Figure 10B:
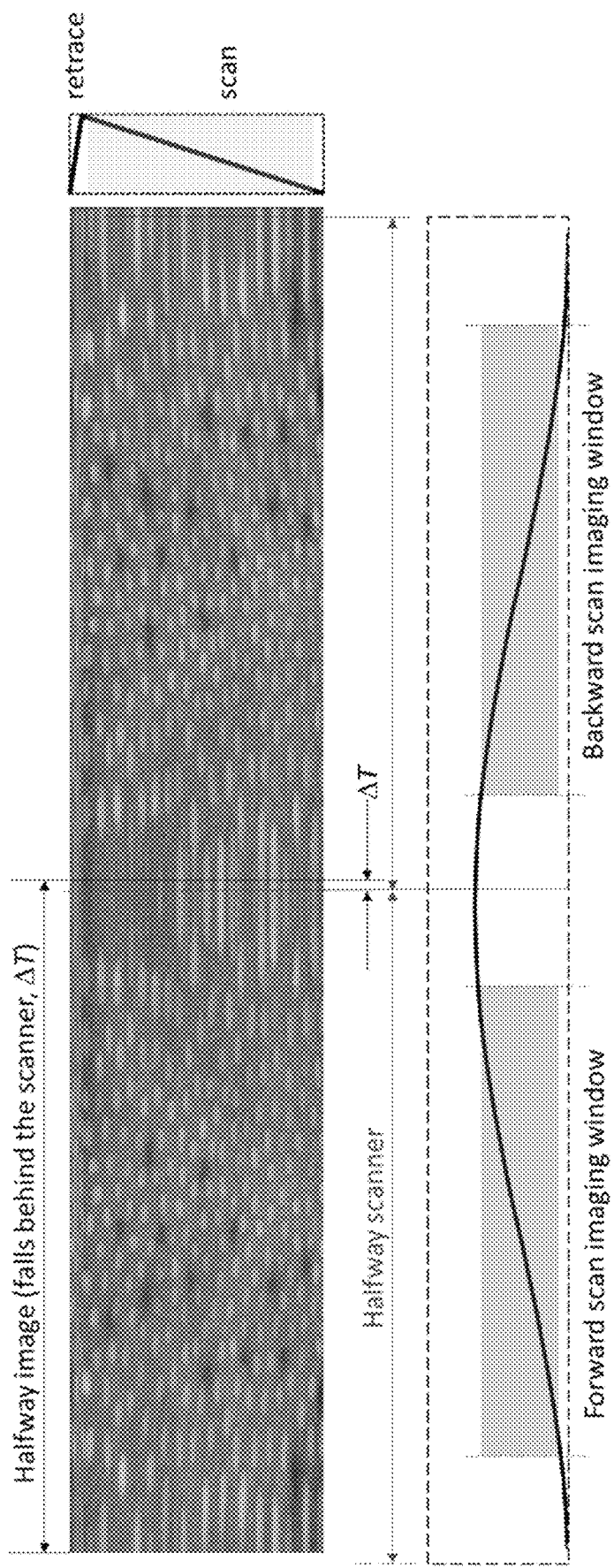
Figure 11A:
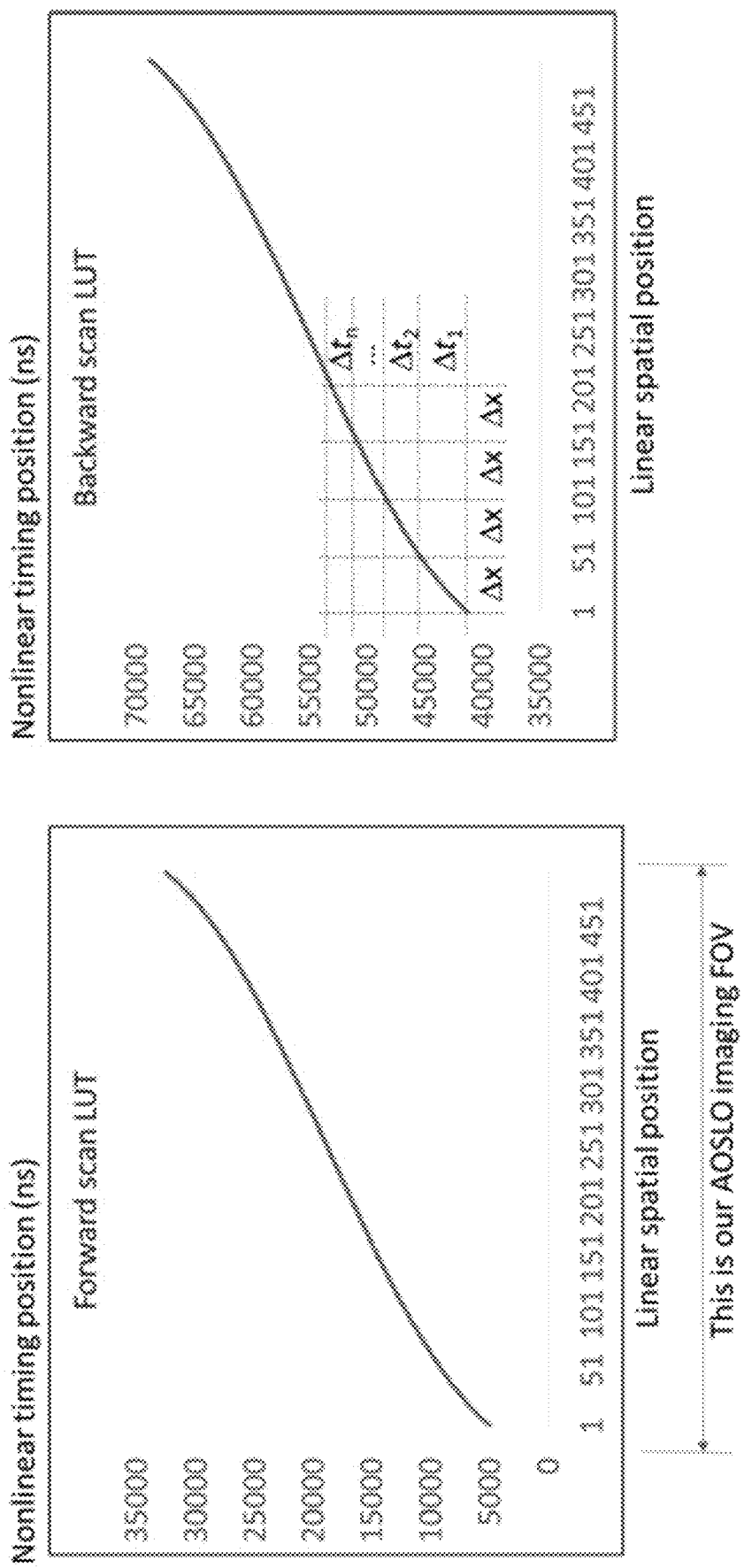
FIGS. 11A and 11B show example experimental lookup tables for compensating for distortion in the FLIM data of the microscopy imaging system in accordance with some embodiments.

FIG. 10B illustrates an average fluorescence intensity image from SPC160 which encodes scanner information. The AOFLIO intensity image averaged directly from ~95 seconds of raw fluorescence signals (2480 frames totally) when the standalone software reshapes the raw SPC160 lifetime data with H-sync and V-sync from AOSLO at fixed pixel spacing of 25 ns. Note that optical tracking is enabled during data acquisition hence data collected from SPC160 has minimum residual motion and decent retinal structure has been achieved without additional digital registration. FIG. 10B also shows how SPC160 collects every single photon from the entire scanning window, including turn-around zones of the resonant scanner where the data is highly stretched and retracing zone of the slow scanner where the data is highly compressed. Furthermore FIG. 10B shows AOFLIO data acquisition is falling ΔT behind the resonant scanner in time, and this is the same ΔT associated with the SPC160 electronic latency. This is a constant once the hardware is characterized, typically on the order of several hundred nanoseconds. FIG. 10B also shows AOSLO imaging windows (forward scan and backward scan) in fast scan direction are aligned at the two centers of the sinusoidal curves as shown at the bottom of FIG. 10B with the real-time algorithm, and the exactly known timing location of these two imaging windows as shown in FIG. 11A, which shows lookup tables from AOSLO to compensate for sinusoidal distortion in AOFLIO data. The timing locations given in FIG. 11A allow the FLIM registration software to pull out the raw SPC160 lifetime data from the same imaging windows, illustrated in the two blue areas in FIG. 10B. In the slow scan direction, the AOSLO crops the entire retracing zone and a few lines of data at the beginning of the ramp curve because the scanner carries mechanical instability after rapid retracing from the previous cycle. Here the yellow box indicates the AOSLO imaging window in slow scan direction. The combination of imaging windows in the fast scan direction (blue boxes) and slow scan direction (the yellow box) includes the entire AOSLO imaging window (green boxes) which is a subset of the scanning window.

To compensate for sinusoidal distortion encoded in the AOFLIO lifetime data, two lookup tables are created in AOSLO imaging software as shown in FIG. 11A, one for the forward scan imaging window and the other for the backward scan imaging window. The real-time algorithm dynamically adjusts both imaging windows to the center of the sinusoidal curve in spite of continuous phase-shifting caused by mechanical damping of the resonant scanner, see Yang et al., Calibration-free sinusoidal rectification and uniform retinal irradiance in scanning light ophthalmoscopy, Opt Lett, 2015 Jan. 1; 40(1):85-8, incorporated by reference in its entirety. In FIG. 11A, the horizontal coordinate is the number of pixels in linear retinal space which is typically indicated as the width of a linear image, and the vertical coordinate is the timing position of each linear pixel against the rising/falling edge of each H-sync. Electronic latency ΔT does exist between AOSLO and SPC160, however, this is only a constant time offset. A simple calibration allows one to conveniently apply ΔT to the two lookup tables once the hardware is characterized.

Figure 11B:
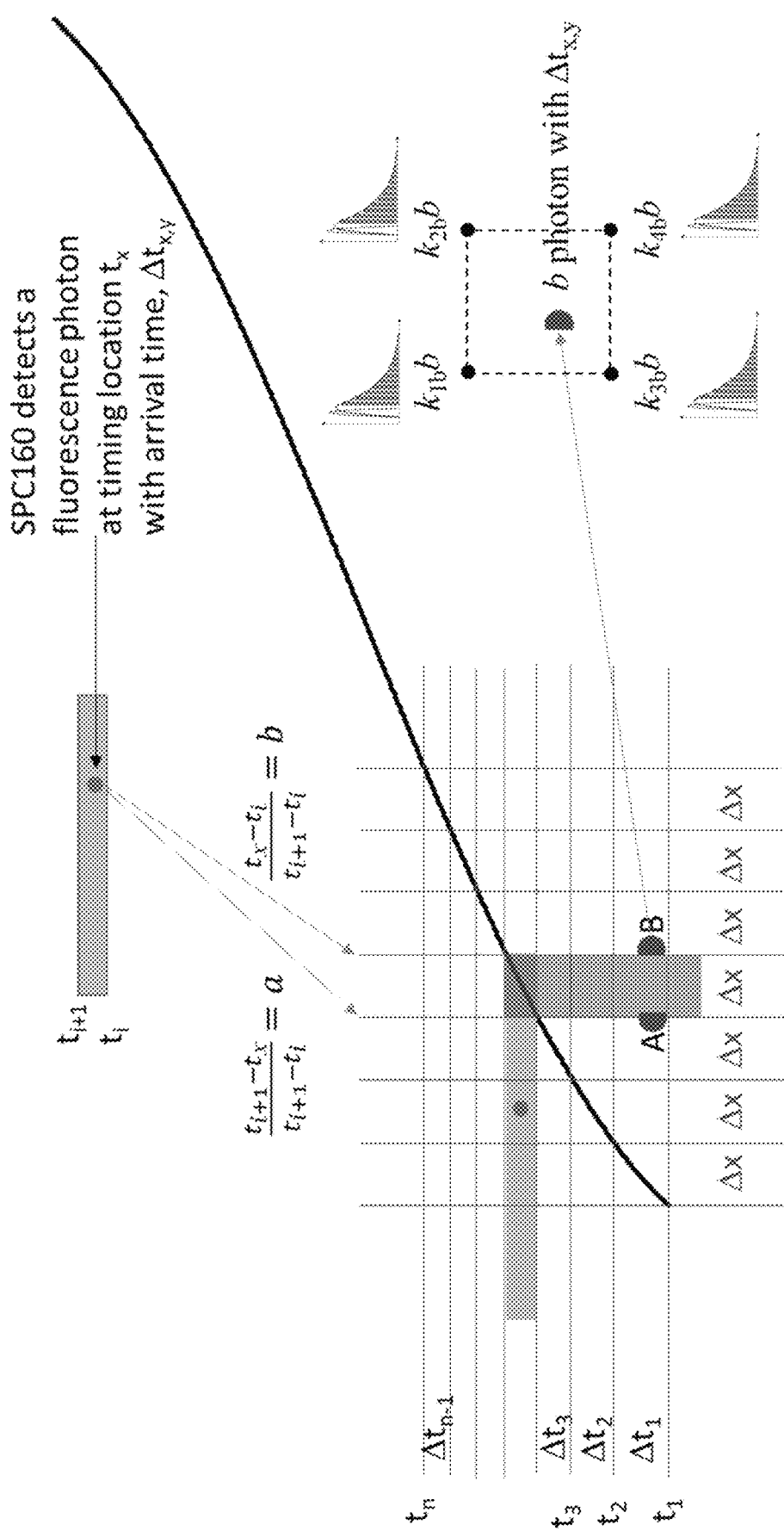

Linear interpolation was implemented to assign raw photons to the spatial bins (with linear retinal spacing) as shown in FIG. 11B. For example, SPC160 detects a fluorescence photon at time $t_x$ (against rising/falling edge of the H-sync) with arrival time $\Delta t_{x,y}$. Because AOSLO and SPC160 are running asynchronously at individual pixel clocks, $t_x$ can sit anywhere between two consecutive AOSLO linear pixels 'A' and 'B' or the corresponding two timing locations $t_i$ and $t_{i+1}$. The method of linear interpolation is then to assign one fraction of the raw photon $$\frac{t_{i+1} - t_x}{t_{i+1} - t_i} = a$$

with arrival time $\Delta t_{x,y}$ to the histogram bin at location A, and assign the other fraction of the raw photon $$\frac{t_x - t_i}{t_{i+1} - t_i} = b$$

with arrival time $\Delta t_{x,y}$ to the histogram bin at location B, with a+b=1. SPC160 photons are discarded when they occur outside of the AOSLO imaging window. The photon's arrival time information is used to then increment each time bin, if there was overlap, by the fraction calculated. It can be seen that for each linear histogram location, the edges of imaging field have longer dwelling time than the center, hence the two edges will have higher SNR than the center after averaging.

The functionality of sinusoidal rectification and histogram assignment are implemented in a standalone software. The raw processed data is stored as a time course of two dimensional arrays of histograms. A sparse matrix is used to conserve memory as most of the bins in the histogram array are empty. The second functionality of this software is to do fluorescence photon arrival time registration.

Co-registration of AOFLIO data takes two steps in one implementation. The first step is to calculate image motion from a AOSLO reflectance video with optional co-registration of a fluorescence intensity video in the AOSLO registration software, and the second step is to load this image motion to FLIM registration software to complete AOFLIO registration.

In the first step with AOSLO registration, for human single-photon fluorescence imaging, the AOSLO simultaneously collected fluorescence intensity image is from the splitter HPMCON-02. Co-registration of fluorescence intensity images against AOSLO reflectance video with the method allows one to retrieve TCA variation across the whole video sequence caused by different imaging wavelengths (e.g., 790 nm IR reflectance vs. 532 nm visible fluorescence) and pupil position change. AOSLO registration software outputs a motion trace with TCA corrected to the FLIM registration software for fluorescence photon arrival time data registration. For monkey and mouse two-photon data, AOSLO registration skips the procedure of TCA compensation because it was found that TCA variation is negligible in anesthetized animals across a recording period of several seconds to several minutes.

In the second step, FLIM registration software takes the motion trace from the first step along with the FLIM histogram data to align the FLIM time course temporally with the AOSLO data using the timing signals sent to the FLIM detector by the AOSLO and trimming any frames before or after AOSLO collection. Once temporally aligned, the software applies the x and y shifts from the motion trace to the FLIM histogram positions pixel by pixel and frame by frame. Each photon is split using bilinear interpolation when reassigning pixels before integrating the time course as heavy aliasing artifacts appear if one maintains integer representations of photon counts. Since raw photons in sinusoidal space are first assigned to linear imaging space and then aligned (or registered) to retinal space, to minimize rounding error of photon assignment, the step of FLIM registration actually runs desinusoiding once again as shown in FIG. 11B where pixel location A receives a photon (arrival time $\Delta t_{x,y}$) and pixel location B receives b photon (the same arrival time $\Delta t_{x,y}$) with a+b=1. The motion of pixels A and B is loaded from the output of AOSLO registration, and it can be seen from FIG. 11B that b photon with arrival time $\Delta t_{x,y}$ will be assigned to four corners of registered pixel locations (black dots) with weighs $k_{1b} \cdot b$, $k_{2b} \cdot b$, $k_{3b} \cdot b$, $k_{4b} \cdot b$ when bilinear interpolation for photon assignment was implemented. Here $k_{1b}+k_{2b}+k_{3b}+k_{4b}=1$. The same procedure repeats for the other partial photon at linear imaging location A to assign it to its four neighbor corners of registered pixel locations with weighs $k_{1a} \cdot a$, $k_{2a} \cdot a$, $k_{3a} \cdot a$, $k_{4a} \cdot a$ and $k_{1a}+k_{2a}+k_{3a}+k_{4a}=1$ (not shown on FIG. 4 for simplicity). It can be seen that each register pixel location is building up photons with a histogram of arrival time $\Delta t$ with time bins e.g., $\Delta t_1, \Delta t_2, \ldots \Delta t_m$, and the number of photon for each time bin is in floating point due to desinusoiding and motion registration. In the final registered and built-up image, the number of photons is rounded in each time bin of each registered pixel location to 0.1 before calculating lifetime $\tau$ (or multiple components $\tau_1, \tau_2, \tau_3, \ldots \tau_n$) at this particular pixel location.

At the same time, the FLIM registration software runs iterations (normalized cross correlation) to fine tune the electronic offset of the two sets of registered and built-up data from forward scan and backward scan. Typically two iterations are sufficient to find this offset at sub-pixel spatial resolution. Finally, the software combines the data from forward scan and backward scan to give a single 2D FLIM histogram array, and simultaneously outputs an intensity image.

In summary, it can be seen that the FLIM registration software has multiple functionalities. It reads in sinusoidal lookup tables from AOSLO imaging software to rectify sinusoidal distortion encoded in AOFLIO photon arrival time data, and reshapes the AOFLIO data and map it to AOSLO imaging space at frame by frame, line by line and pixel by pixel. It reads in image motion with optional TCA correction from the AOSLO registration software and co-registers the spatially linear AOFLIO photon arrival time images. Here the optional TCA-corrected eye motion from AOSLO has previously co-registered the fluorescence intensity images from the splitter. It merges the co-registered and built-up two lifetime images from forward scan and backward scan to generate a higher SNR image, by a factor of $\sqrt{2}$ theoretically. The whole data flow is illustrated in the diagram in FIG. 8. It is reasonable to expect that the two images of "Registered and averaged AOFLIO intensity image 1" and "Registered and averaged AOFLIO intensity image 2" shown in FIG. 8 should be the same because the source signal comes from the same hybrid PMT.

Figure 8:
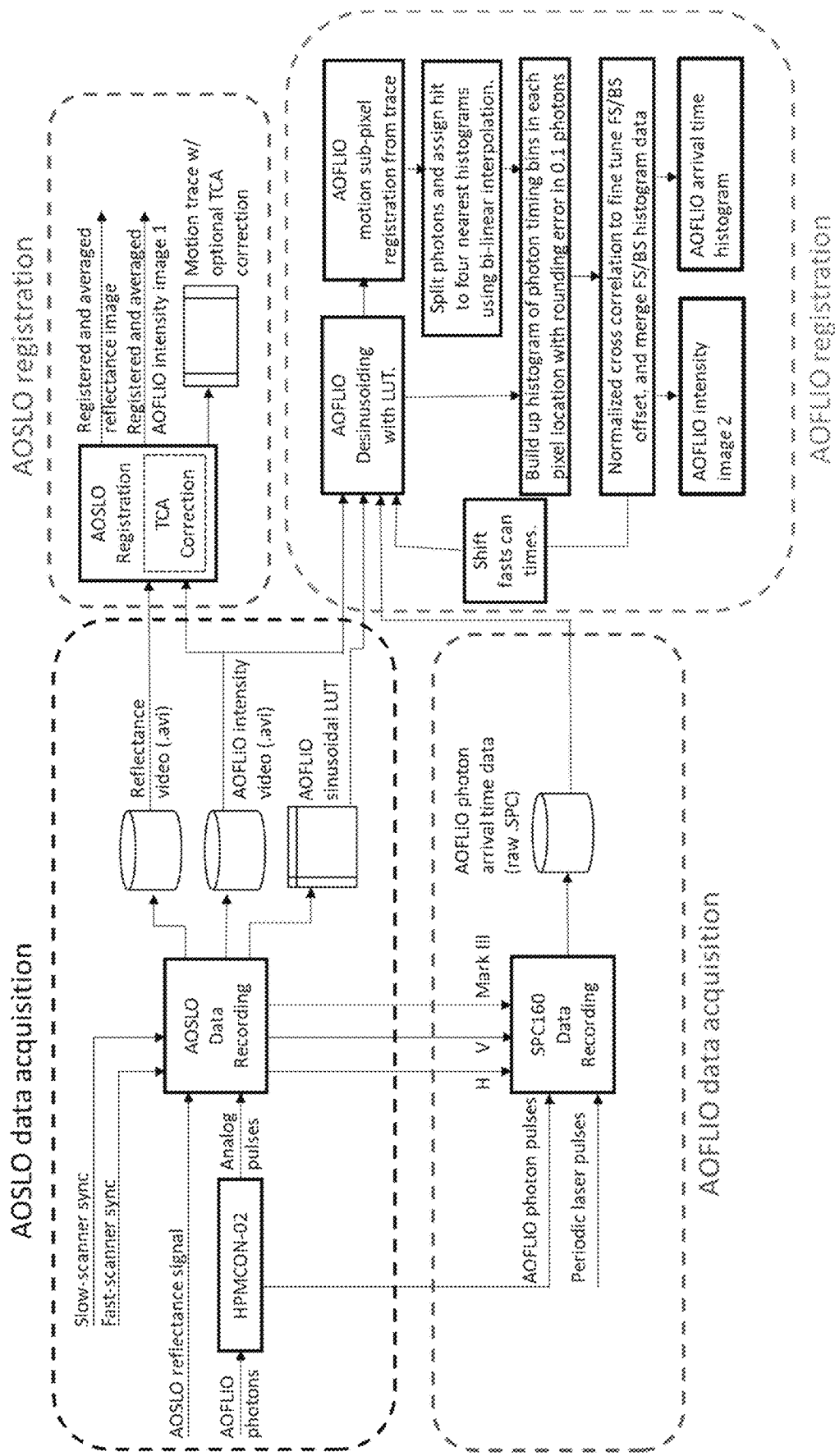
FIG. 8 is a block diagram an example experimental control flow of AOFLIO for data acquisition, sinusoidal rectification, and motion registration in accordance with some embodiments.

The block of 'AOFLIO registration' in FIG. 8 further shows how after the step of AOFLIO desinusoiding, the software runs normalized cross correlation between the averaged images from forward scan and backward scan to fine tune the offset caused by AOFLIO electronic latency. In some cases with optical tracking turned on, the step of motion registration becomes less essential, and the software offers the option to output desinusoided and FS/BS merged AOFLIO intensity image and timing data directly. FLIM registration software also loads AOFLIO intensity AVI video from the HPMCON-2 splitter recorded by AOSLO to further determine precisely start position of lifetime data for two reasons. The first being that the AVI video contains shutter information which is aligned with AOSLO recording, and the second being the 'Mark III' flag recorded by SPC160 software usually contains uncertain delay in 1-2 frames of recording.

At the same time, FLIM registration software run iteration (normalized cross correlation) to fine tune electronic offset of the two sets of registered and built-up data from forward scan and backward scan. Typically two iterations are sufficient to find this offset at sub-pixel spatial resolution. Finally, the software combines the data from forward scan and backward scan to give a single 2D FLIM histogram array, and simultaneously outputs an intensity image.

Figures 12A, 12B:
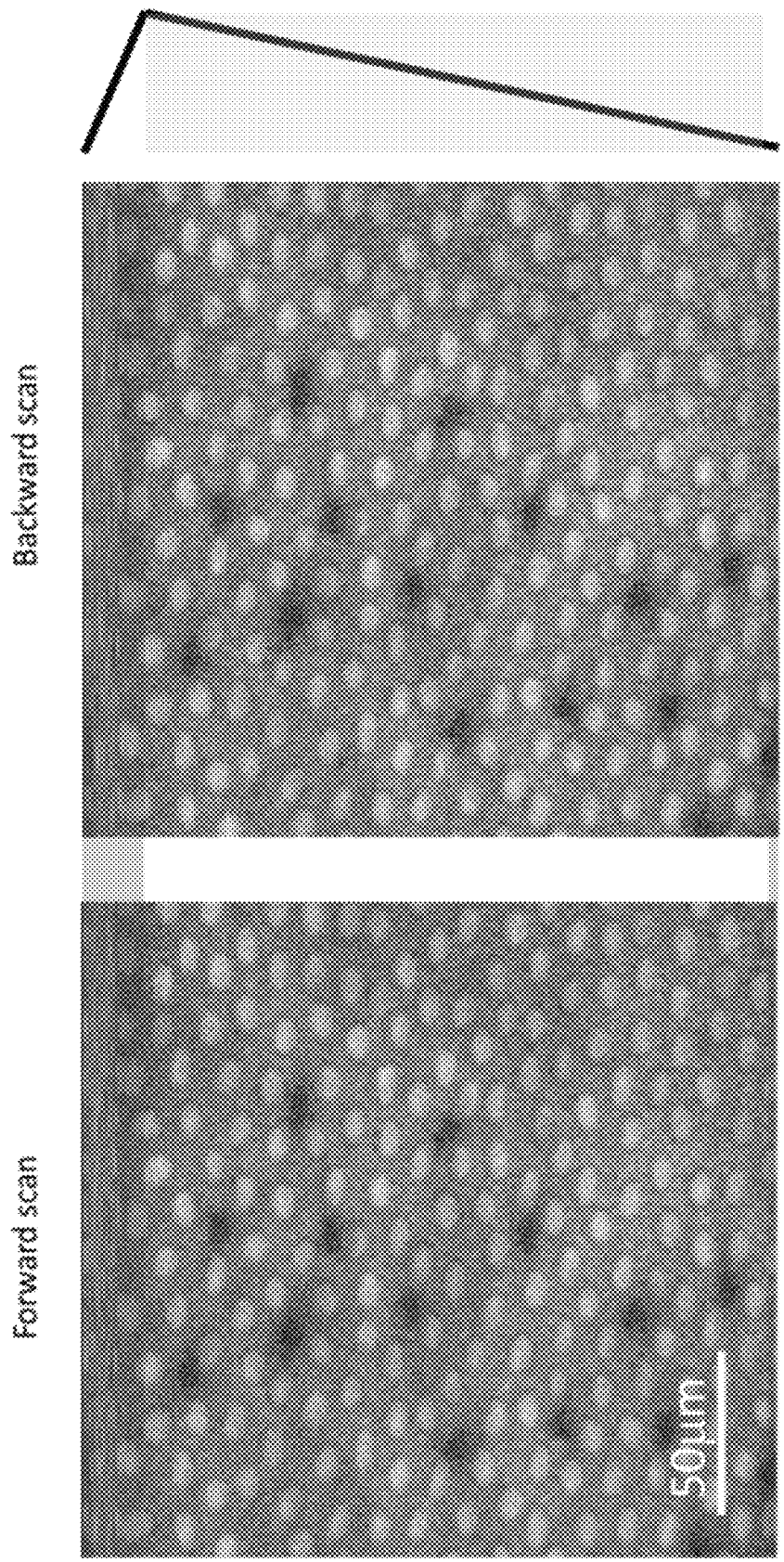
FIGS. 12A and 12B show example distortion-free experimental FLIM images from the microscopy imaging system in accordance with some embodiments.
Figures 12C, 12D:
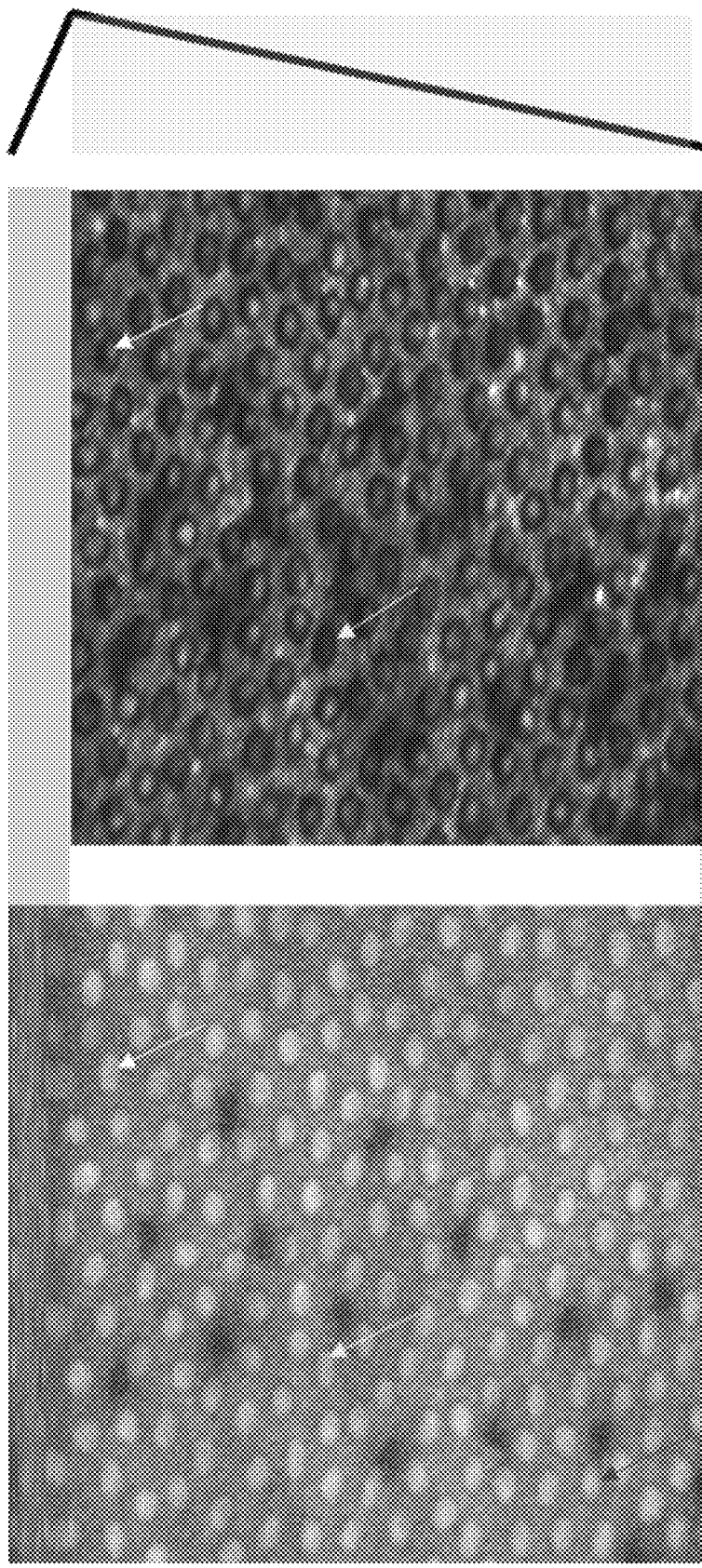
FIG. 12C shows an averaging of the example distortion-free experimental FLIM images of FIGS. 12A and 12B in accordance with some embodiments.
FIG. 12D shows an SLO image from the microscopy imaging system for comparison to the averaged FLIM image of FIG. 12C in accordance with some embodiments.

Applying the two lookup tables from FIG. 11A on the raw SPC lifetime data, the two linear images for forward scan and backward scan are obtained as shown in FIGS. 12A-12B. The merged images of FIGS. 12A-12B is shown in FIG. 12C. The two red zones at the top and bottoms of these fluorescence images will be cropped based on data from AOSLO imaging window in slow scan direction. FIG. 12D shows the associated reflectance image where the retinal structures have been aligned at ±0.5 pixels precision after sinusoidal rectification in fast scan direction and cropping in slow scan direction.

The AOSLO data was acquired only within the two imaging windows shown, the forward scan imaging window and the backward scan imaging window. Anything beyond these two imaging windows is discarded because of excessive sinusoidal distortion caused by the resonant scanning mirror 135.

From the two imaging windows, two lookup tables (LUT) were generated, one for the forward scan and one for the backward scan. As shown in FIGS. 11A-11B, the horizontal axis now represents a uniform spatial spacing across the fast scan direction, and the vertical timing axis becomes nonlinear. After sinusoidal compensation, data on the two edges of each imaging window have larger dwelling time, and thus have the chance to receive more photons than the central portion does in a uniform spatial spacing.

To achieve the most accurate sinusoidal compensation, a dynamic offset is added to the lookup tables of FIGS. 11A-11B. Two factors contribute to this offset. This first one is the gradual phase shift of the resonant scanning mirror 135, such as the EOPC SC-30. Correction of this issue is further described in Yang et al., Optics Letters, Vol. 40, Issue 1, pp. 85-88, 2015 and U.S. Pat. No. 9,485,383, each of which is incorporated herein by reference in their entirety. In some embodiments, the sinusoidal distortion is pre-calibrated with a different method such as using a grid, a grating, or any suitable tool. A de-sinusoiding lookup table or a conversion matrix is then generated to compensate for sinusoidal distortion in real time or post processing. The second factor is the electronic latency between the SLM system 130 (AOSLO) and the FLIM system 110 (TCSPC), which is a constant and can be pre-calibrated or determined for each image set, and shown in the following equations:

$$\text{LUT}_{fs} = (t_1, t_2, \ldots, t_n) + f(T_i) + f_0 \qquad (3)$$

$$\text{LUT}_{fs} = (t_1, t_2, \ldots, t_n) + f(T_i) + f_0 + T_0 \qquad (4)$$

where $f(T_i)$ is the portion of phase shift changing slowly over time, $f_0$ is the fixed portion caused by the difference of electronic latency between the FLIM system 110 (SPC160) and SLM system 130 (AOSLO) and it does not change over time, and $T_0$ is another constant turn-around time from the forward scan imaging window to backward scan imaging window as shown in FIGS. 10A-10B and determined by configuration parameters of the imaging system 100. It is understood that the variation of $(t_1, t_2, t_n)$ in Equations (3) and (4) are at fine scales such as those shown in vertical coordinate of FIGS. 11A-11B, but the variation of $f(T_i)$ is slow, in seconds or tens of seconds, because of slow mechanical damping of the resonant scanner. Therefore, for each data recording in 2-3 minutes, one set of new $\text{LUT}_{fs}$ and $\text{LUT}_{bs}$ are generated to compensate for the issue of phase shift from the resonant scanning mirror 135. Applying Equations (3) and (4) provides two images with uniform spatial spacing, for example:

Spatial index of linear image, forward scan: ($x_1$, $x_2$, . . . , $x_n$)

Spatial index of linear image, backward scan: ($x_n$, $x_{n-1}$, . . . , $x_1$)

After the two lookup tables are applied on the raw FLIM data frame by frame, the backward scan image is flipped left and right because of mirror symmetry. The final outputs of the two FLIM images are presented in FIGS. 12A-12B, showing distortion-free FLIM images across the fast scan direction for both forward scan and backward scan of the resonant scanning mirror 135. The images shown in FIGS. 12A-12B are reshaped and averaged directly from raw SPC160 photon arrival time data which does have optical tracking enabled during data recording. However, it is typical to see some residual image motion after optical tracking.

Because of the precise alignment for data from both the forward scan and backward scan with an error of ±0.5 pixels, these two images can be averaged together to achieve an increase of $\sqrt{2}$SNR. The averaged image is illustrated in FIG. 12C.

To further verify the performance of sinusoidal compensation, FIGS. 12C-12D illustrates the alignment between the FLIM image (SPC160) (FIG. 12C) and the SLM image (AOSLO) (FIG. 12D) from the same retinal location. As shown, the error is within ±0.5 pixel. FIGS. 12C-12D also show how the SLM system 130 (AOSLO) does data cropping to eliminate data in the areas when the slow scanning mirror 140 is retracing and when it is settling down after a quick retracing. The final FLIM data should also be cropped in these two areas as well.

The data shown were acquired after optical tracking was applied, and exemplary details have been described in Yang et al., Biomedical Optics Express, 5(9), 3174-3191, 2014, and incorporated herein by reference in its entirety. Therefore, the raw data carried a minimum amount of residual image motion. Direct integration of raw FLIM data with sinusoidal compensation alone still gives acceptable FLIM final images. The methods below describe new methods that were applied in post processing for additional digital registration to further improve the quality of both SLM and FLIM images.

After sinusoidal compensation with the lookup tables in FIGS. 11A-11B, the FLIM (TCSPC) data is mapped to the same scanner space as that of the SLM (AOSLO) data, regardless, with or without optical tracking. Digital registration improves performance of the FLIM data. This step is particularly important for data from human's retinas. Some of these registration methods have been described in Yang et al., Biomedical Optics Express, 5(9), 3174-3191, 2014, and in Granger et al., Investigative Ophthalmology & Visual Science, 59(15), 5705-5716, 2018, each of which is incorporated herein by reference in their entirety. The registration method for offline digital registration in this invention is further described below.

In real-time imaging system 100, every time a set of videos is recorded, the first step is to activate a closed-loop optical tracking, and then run the procedure in FIG. 4. This is not necessary or possible for every application.

The optical tracking here is image based, and a reference image will be recorded in a hard drive whenever a new tracking session is activated, and exemplary details have been described in U.S. Pat. No. 9,226,656, and which is incorporated herein by reference in its entirety. Define this SLM reference image as $I_k$. Here subscript 'k' indicates tracking session k. Real-time optical tracking is a process where the closed-loop algorithm will steer the tracking mirrors (135, 140), such as a PI S-335.2SHM1 tip/tilt mirror, to lock the imaging beam to the reference image with residual motion in several arcminutes, and exemplary details have been described in Yang et al., Biomedical Optics Express, 5(9), 3174-3191, 2014, and incorporated herein by reference in its entirety. Therefore, 'tracking' and 'locking' have similar meaning in this interpretation.

Data recorded from the procedures in FIG. 4 still carries residual motion as described above. To further improve image quality, the SLM (AOSLO) reference image $I_k$ was used as the reference to calculate this residual image motion, as illustrated in FIG. 13, where the slow scan occurs in the vertical direction. It should be understood that any image from the recorded SLM (AOSLO) video (image stack) can be used as the reference image. A composite image or image from other recordings may also be used as the reference image. A strip-level motion calculation is applied to retrieve finer motions, and thus to compensate for in-frame distortion from the scanning imaging system 100. By "strip-level", the whole image is divided into multiple strips in the slow scan direction, with or without strip overlap, illustrated as ($S_1$, $S_2$, $S_3$, . . . $S_M$) in FIG. 13. Therefore, for each frame, M pairs of translational motion ($x_{n,1}$, $y_{n,1}$), ($x_{n,2}$, $y_{n,2}$), ($x_{n,3}$, $y_{n,3}$), . . . , ($x_{n,M}$, $y_{n,M}$) are acquired. Here subscript 'n' indicates frame index and 'M' indicate strip index. Motion ($x_{n,1}$, $y_{n,1}$), ($x_{n,2}$, $y_{n,2}$), ($x_{n,3}$, $y_{n,3}$), . . . , ($x_{n,M}$, $y_{n,M}$) for frame 'n' are extrapolated to the image height with any suitable method such as linear or cubic extrapolation, to get:

$$(x_{n,1},y_{n,1}),(x_{n,2},y_{n,2}),(x_{n,3},y_{n,3}), \ldots ,(x_{n,M},y_{n,M}) \rightarrow (x_{n,1}, y_{n,1}),(x_{n,2},y_{n,2}),(x_{n,3},y_{n,3}), \ldots ,(x,y_{n,H}) \quad (5)$$

where the subscript 'H' indicates number lines per frame or image height. ($x_{n,1}$, $y_{n,1}$), ($x_{n,2}$, $y_{n,2}$), ($x_{n,3}$, $y_{n,3}$), . . . , ($x_{n,H}$, $y_{n,H}$) are then applied to the raw image $I_{k,n}$ to register it to the reference image. In some embodiments, the image motions in Eq (5) are obtained through a different method, e.g., by recording pupil position of the eye and then converting pupil position to the image motion for registration.

FIGS. 14A-14B illustrate two SLM (AOSLO) averaged reflectance images from the same raw video recorded with the method in FIG. 4, where FIG. 14A is a result with optical tracking only, and FIG. 14B is after additional digital registration. AS described above, after compensation of sinusoidal distortion both SLM data and FLIM data are mapped to exactly the same scanner space. The additional digital registration produces images with a finer structure.

Figure 16B:
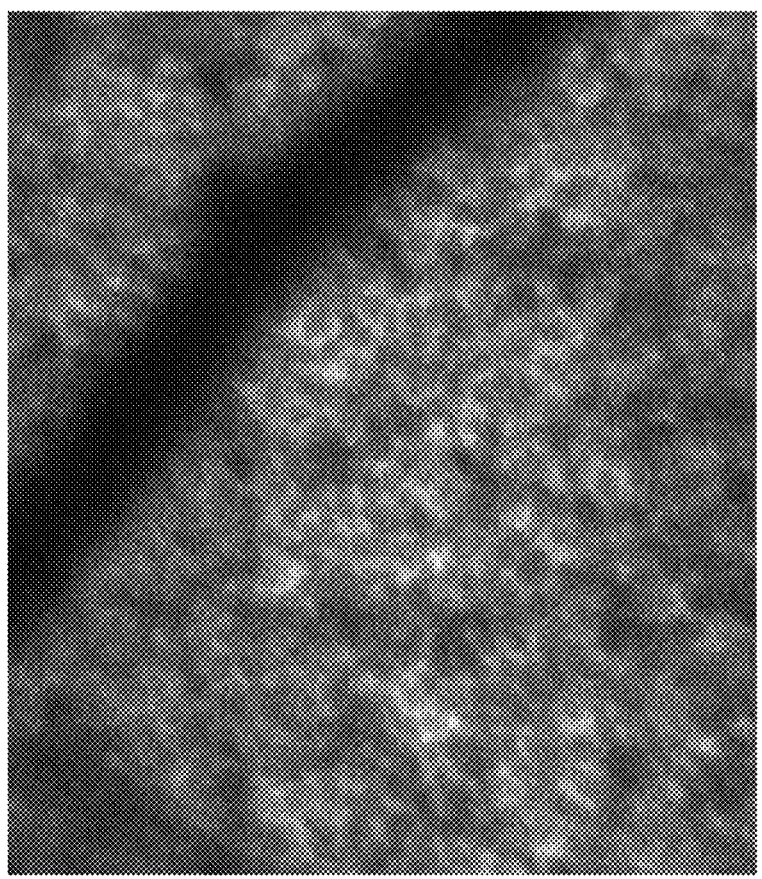
FIGS. 16A and 16B show example experimental averaged fluorescence intensity images without and with registration, respectively, from a healthy human retina in accordance with some embodiments.
Figure 16A:
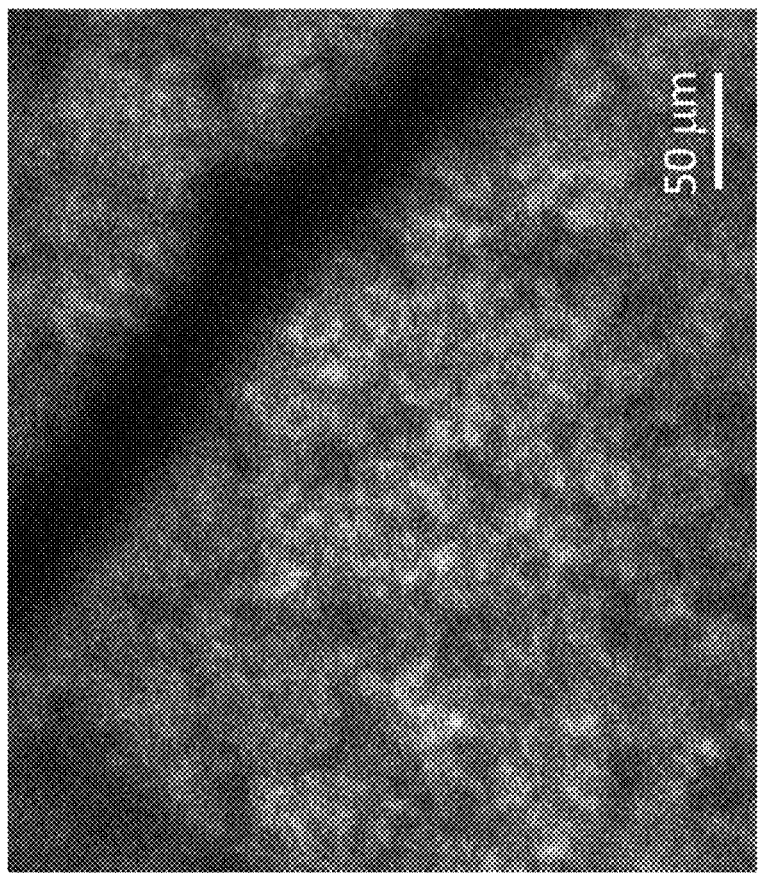

The same motion ($x_{n,1}$, $y_{n,1}$), ($x_{n,2}$, $y_{n,2}$), ($x_{n,3}$, $y_{n,3}$), . . . , ($x_{n,H}$, $y_{n,H}$) is applied to the FLIM image at frame n, with superposition of TCA compensation in the amount of ($\Delta X$, $\Delta Y$)$_n$, or ($x_{n,1}$, $y_{n,1}$)+($\Delta Z$, $\Delta Y$)$_n$, ($x_{n,2}$, $y_{n,2}$)+($\Delta X$, $\Delta Y$)$_n$, ($x_{n,3}$, $y_{n,3}$)+($\Delta X$, $\Delta Y$)$_n$, . . . , ($x_{n,H}$, $y_{n,H}$)+($\Delta X$, $\Delta Y$)$_n$, and then all frames from this recording are integrated. TCA amount ($\Delta X$, $\Delta Y$)$_n$ changes over time, hence it is a function of frame index n. TCA amount ($\Delta X$, $\Delta Y$)$_n$ is calculated from the co-registration between SLO reflectance images and FLIM intensity images, and it has been described in U.S. Pat. No. 10,092,181, incorporated herein by reference in its entirety. This step is also defined as "co-registration". In some embodiments, TCA is negligible and TCA compensation is skipped, and hence all ($\Delta X$, $\Delta Y$)$_n$ are (0, 0). In some embodiments, residual image motion is minimal possibly because of negligible sample motion or since optical tracking is applied, and hence all ($x_{n,k}$, $y_{n,k}$) are (0,0) and the entire co-registration is skipped. The comparison without vs with co-registration is illustrated in FIGS. 15A-15C, where FIG. 15A illustrates a set of residual image motion after optical tracking from an anesthetized monkey typically in 0.15-0.25 arcmin RMS, FIG. 15B shows the direct output including optical tracking, and FIG. 15C shows the output with additional co-registration, see Yang et al., Closed-loop optical stabilization and digital image registration in adaptive optics scanning light ophthalmoscopy, Biomedical Optics Express Vol. 5, Issue 9, pp. 3174-3191 (2014) and Hu et al., "Modeling and optimization of closed-loop retinal motion tracking in scanning light ophthalmoscopy", Journal of the Optical Society of America A Vol. 36, Issue 5, pp. 716-721 (2019), each incorporated herein by reference in their entirety. Similarly, FIGS. 16A-16B show averaged fluorescence intensity images without and with registration, respectively, of a healthy human retina. FIG. 16A shows optical tracking only where microsaccades and failed tracking are removed in post processing, and FIG. 16B shows additional registration where finer RPE structure is seen and where the software picks up additional photons from occasions of microsaccades and failed tracking hence the higher SNR.

The additional digital registration produces images with a finer structure, where, for example, the images of photoreceptors show not only cones but also rods. In each case, there is improvement of image quality, and this result is consistent across all data recorded from the AOSLO systems. Moreover, in cases with human imaging, due to failed tracking, blinks and microsaccades, additional registration collects 20%-40% more photons than optical tracking only, and hence higher SNR is usually seen in the averaged image. The cases here indicate the step of registration improves image quality substantially.

Figure 17B:
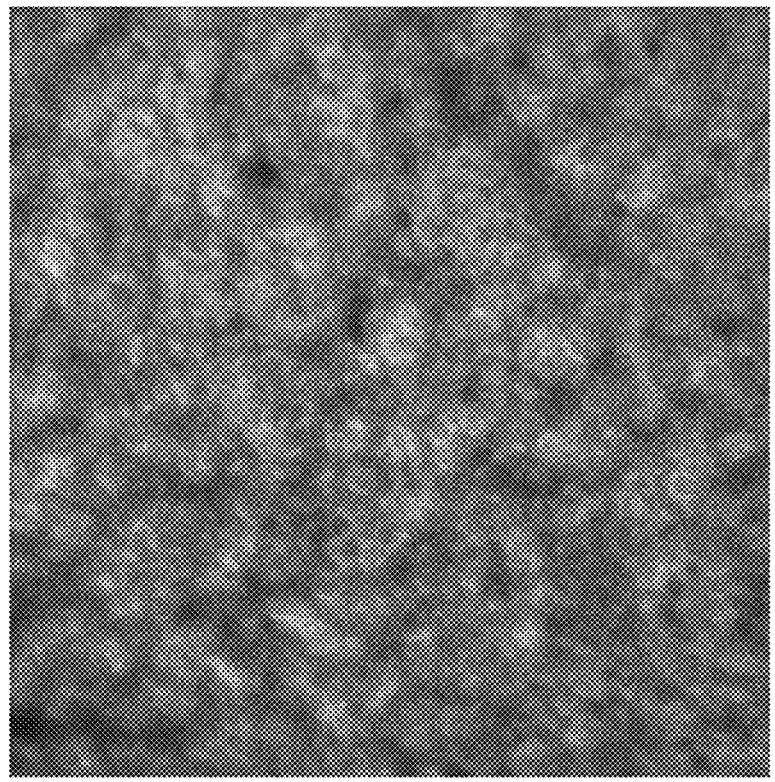
FIGS. 17A and 17B show a comparison of experimental registered and averaged fluorescence intensity images from the SPC160 and the AOSLO, respectively, in accordance with some embodiments.
Figure 17A:
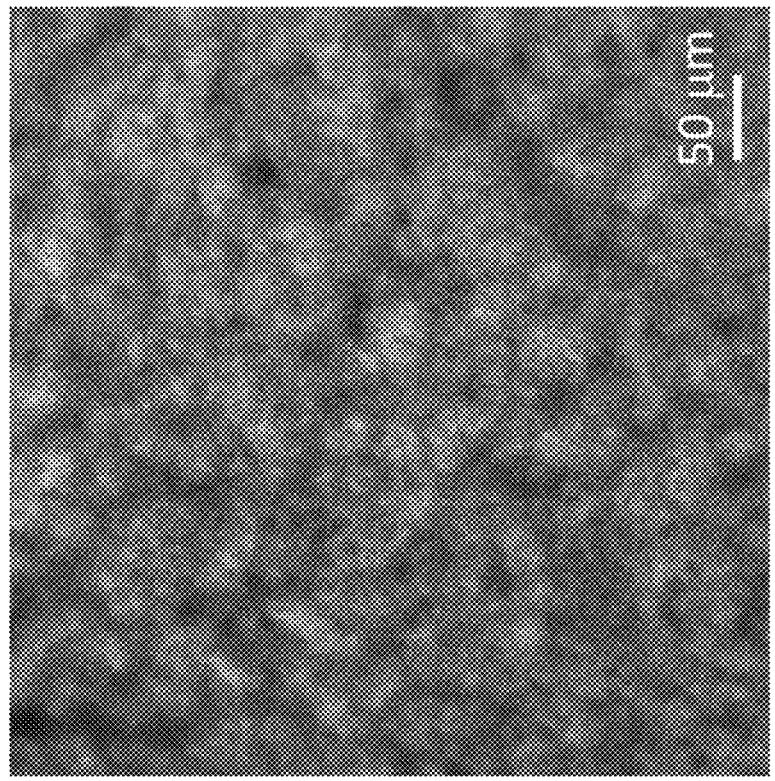

As indicated above, it was expected that the two registered and averaged FLIM intensity images from AOSLO and SPC160 would be the same because both of them have the same source signal coming from the same hybrid PMT. FIGS. 17A-17B illustrate two of these images from a healthy human subject where spatial difference of retinal structure is within ±0.5 pixel error. This result was consistent across all other data.

As described above the capability to achieve cellular resolution in AOFLIO has been demonstrated. Sinusoidal distortion encoded in fluorescence lifetime data has been rectified successfully and the fluorescence lifetime images are aligned to retinal features of the AOSLO reflectance images precisely within ±0.5 pixel spatial deviation in the entire imaging window. After co-registration against the AOSLO reflectance video, not only cones, but also rods, can be identified from the AOFLIO lifetime images. Moreover, the combination of forward scan and backward scan was used to boost SNR of the combined image by a factor of $\sqrt{2}$ (1.414) theoretically. Data analyzed from 3 healthy subjects with 11 recordings in total and each recording in 20 seconds or 30 seconds shows consistently that SNR is improved 1.153±0.082. Here image SNR is calculated from the formula $$SNR = \frac{\text{Mean (Image)}}{\text{StDev (Image)}},$$

and the improvement of SNR is calculated by $2 \times SNR_{combined}/(SNR_{FS}+SNR_{BS})$. It was also found that the difference of $SNR_{FS}$ and $SNR_{BS}$ is less than 1% in all cases and the photon number is doubled after the combination. The actual SNR improvement 1.153 instead of the theoretical 1.414, is probably caused by low photon numbers.

These improvements have substantial impacts on the applications of retinal microscopy. At the same time, this capability can be extended beyond AOFLIO to FLIO and other scanning applications of fluorescence lifetime imaging such as region of interest (ROI) scanning, for example.

On data processing, two in-house offline software are developed to run AOSLO image registration and AOFLIO data co-registration sequentially. AOSLO first registers reflectance videos and optionally co-registers fluorescence intensity videos with TCA correction, and output a set of motion trace. FLIM registration software loads sinusoidal lookup tables and the motion trace to complete AOFLIO data rectification and registration The following reference are incorporated herein by reference in their entirety:

U.S. Pat. No. 9,226,656, Real-time optical and digital image stabilization for adaptive optics scanning ophthalmoscopy.

U.S. Pat. No. 9,406,133, System and method for real-time image registration.

U.S. Pat. No. 10,092,181, Method of imaging multiple retinal structures.

US Patent Application Publication—US2015/0042954A1, System and method for fluorescence lifetime imaging aided by adaptive optics.

U.S. Pat. No. 9,485,383, Imaging based correction of distortion from a scanner.

Gray, D., Merigan, W., Wolfing, J., Gee, B., Porter, J., Dubra, A., Twietmeyer, T., Ahmad, K., Tumbar, R., Reinholz, F., Williams, D. R. (2006). In vivo fluorescence imaging of primate retinal ganglion cells and retinal pigment epithelial cells. Optics Express, 14(16), 7144-7158.

Sharma R, Schwarz C, Williams D R, Palczewska G, Palczewski K, Hunter J J (2016). In vivo TwoPhoton Fluorescence Kinetics of Primate Rods and Cones. Invest Ophthalmol Vis Sci. 57(2):647-57. doi: 10.1167/iovs.15-17946. PMID: 26903225.

Qiang Yang, Lu Yin, Koji Nozato, Jie Zhang, Kenichi Saito, William H. Merigan, David R. Williams, and Ethan A. Rossi, Calibration-free sinusoidal rectification and uniform retinal irradiance in scanning light ophthalmoscopy, Optics Letters, Vol. 40, Issue 1, pp. 85-88 (2015).

Q. Yang, J. Zhang, K. Nozato, K. Saito, D. R. Williams, A. J. Roorda, and R. A. Rossi, "Closed-loop optical stabilization and digital image registration in adaptive optics scanning light ophthalmoscopy," Biomed. Opt. Express, 5(9), 3174-3191 (2014).

Charles E. Granger, Qiang Yang, Hongxin Song, Kenichi Saito, Koji Nozato, Lisa R. Latchney, Bianca T. Leonard, Mina M. Chung, David R. Williams, and Ethan A. Rossi, Human Retinal Pigment Epithelium: In Vivo Cell Morphometry, Multispectral Autofluorescence, and Relationship to Cone Mosaic, Invest Ophthalmol Vis Sci., 59(15), 5705-5716 (2018).

Feeks J A & Hunter J J. Adaptive optics two-photon excited fluorescence lifetime imaging ophthalmoscopy of exogenous fluorophores in mice. Biomed. Opt. Express 8, 2483-2495 (2017).

M. Tantama, Y. P. Hung, and G. Yellen, "Imaging intracellular pH in live cells with a genetically encoded red fluorescent protein sensor," J. Am. Chem. Soc. 133(26), 10034-10037 (2011).

D. Schweitzer, M. Hammer, F. Schweitzer, R. Anders, T. Doebbecke, S. Schenke, E. R. Gaillard, and E. R. Gaillard, "In vivo measurement of time-resolved autofluorescence at the human fundus," J. Biomed. Opt. 9(6), 1214-1222 (2004).

D. Schweitzer, S. Schenke, M. Hammer, F. Schweitzer, S. Jentsch, E. Birckner, W. Becker, and A. Bergmann, "Towards metabolic mapping of the human retina," Microsc. Res. Tech. 70(5), 410-419 (2007).

C. Dysli, M. Dysli, V. Enzmann, S. Wolf, and M. S. Zinkernagel, "Fluorescence Lifetime Imaging of the Ocular Fundus in Mice," Invest. Ophthalmol. Vis. Sci. 55(11), 7206-7215 (2014).

Sharma R, Yin L, Geng Y, Merigan W, Palczewska G, Palczewski K, Williams D, Hunter J (2013), In vivo two-photon imaging of the mouse retina. Biomed. Opt. Express 4, 1285-1293.

Dubra, A., Sulai, Y., Norris, J., Cooper, R., Dubis, A., Williams, D. R., Carroll, J. (2011). Non-invasive in vivo imaging of the human rod photoreceptor mosaic using a confocal adaptive optics scanning ophthalmoscope. Biomedical Optics Express, 2(7), 1864-1876 doi:10.1364/BOE.2.001864.

Zhang J, Yang Q Saito K, Nozato K, Roorda A, Williams D R, and Rossi E A (2015). An adaptive optics imaging system designed for clinical use: publisher's note. Biomed. Opt. Express 6, 2864-2864.

David W. Arathorn, Qiang Yang, Curtis R. Vogel, Yuhua Zhang, Pavan Tiruveedhula, and Austin Roorda, Retinally stabilized cone-targeted stimulus delivery, Optics Express Vol. 15, Issue 21, pp. 13731-13744 (2007) https://doi.org/10.1364/OE.15.013731

Qiang Yang, David W. Arathorn, Pavan Tiruveedhula, Curtis R. Vogel, and Austin Roorda, Design of an integrated hardware interface for AOSLO image capture and cone-targeted stimulus delivery, Optics Express Vol. 18, Issue 17, pp. 17841-17858 (2010) https://doi.org/10.1364/OE.18.017841

Aby Joseph, Colin J Chu, Guanping Feng, Kosha Dholakia, Jesse Schallek, Label-free imaging of immune cell dynamics in the living retina using adaptive optics, eLife 2020; 9:e60547 DOI: 10.7554/eLife.60547, https://elifesciences.org/articles/60547

C. E. Granger, Q. Yang, H. Song, K. Saito, K. Nozato, L. R. Latchney, B. T. Leonard, M. M. Chung, D. R. Williams, and E. A. Rossi, "Human retinal pigment epithelium: In vivo cell morphometry, multispectral autofluorescence, and relationship to cone mosaic," Investig. Ophthalmol. Vis. Sci. 59, 5705-5716 (2018).

Xinqi Hu and Qiang Yang, "Modeling and optimization of closed-loop retinal motion tracking in scanning light ophthalmoscopy", Journal of the Optical Society of America A Vol. 36, Issue 5, pp. 716-721 (2019) https://doi.org/10.1364/JOSAA.36.000716.

Lorenzo Scipioni, Alessandro Rossetta, Giulia Tedeschi, Enrico Gratton, "Phasor S-FLIM: a new paradigm for fast and robust spectral fluorescence lifetime imaging", Nature Methods, 18(5):542-550. doi: 10.1038/s41592-021-01108-4, (2021).

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention.

What is claimed is:

1. A microscopy imaging system, comprising:
   a fluorescence lifetime imaging microscopy (FLIM) system comprising a pulsed light source configured to direct a plurality of excitation light pulses onto a sample, a photo detector configured to detect emitted fluorescent photons created by the plurality of excitation light pulses interacting with the sample, and a FLIM data acquisition system configured to measure the time interval between the excitation light pulses and the detected emitted fluorescent photons;
   a scanning light microscopy (SLM) system comprising a SLM data acquisition system, a fast scanning mirror and a slow scanning mirror, wherein the fast scanning mirror is configured to scan the excitation light pulses across the sample at a rate between 1 kHz and 100 kHz, and wherein the slow scanning mirror is configured to scan the excitation light pulses across the sample at a rate between 1 Hz and 100 Hz; and
   a data processing system communicatively connected to the FLIM and SLM systems, including a non-transitory computer-readable medium with instructions stored thereon, that when executed by a processor, performs steps comprising:
   receiving acquired data signals from the FLIM and SLM data acquisition systems;
   creating SLM reflectance images from the SLM data signals;
   choosing a reference image from the SLM reflectance images;
   spatially aligning the SLM reflectance images to the SLM reference image;
   creating FLIM intensity images and photon arrival time data from the FLIM data signals;
   dynamically optimizing an optical pinhole location and imaging focal plane of the FLIM signals by using real-time FLIM intensity signals to achieve a maximum FLIM photon flux rate and an optimized FLIM image contrast; and
   spatially aligning the FLIM intensity images and photon arrival time data to the spatially aligned SLM reflectance images.

2. The system of claim 1, wherein the FLIM and SLM data signals are acquired simultaneously.

3. The system of claim 1, wherein the FLIM system has a cellular level resolution.

4. The system of claim 1, wherein the fast scanning mirror is a fast resonant scanning mirror or a fast polygon scanning mirror, and the slow scanning mirror is a slow linear scanning mirror.

5. The system of claim 1, wherein the scanning motions of the fast and slow scanning mirror are synchronized or phase-locked.

6. The system of claim 1, wherein the SLM system comprises a scanning light ophthalmoscopy (SLO) system or an adaptive optics scanning light ophthalmoscopy (AO-SLO) system.

7. A microscopy imaging method, comprising:
   providing a fluorescence lifetime imaging microscopy (FLIM) system comprising a pulsed light source configured to direct a plurality of light pulses onto a sample, a photo detector configured to detect emitted fluorescent photons created by the plurality of excitation pulses interacting with the sample, and a FLIM data acquisition system configured to measure the time interval between the excitation light pulses and the detected emitted fluorescent photons;

providing a scanning light microscopy (SLM) system comprising a SLM data acquisition system, a fast scanning mirror and a slow scanning mirror, wherein the mirrors are configured to scan the light pulses across the sample;

providing a data processing system communicatively connected to the FLIM and SLM systems;

receiving acquired data signals from the FLIM and SLM data acquisition systems;

creating SLM reflectance images from the SLM data signals;

choosing a reference image from the recorded SLM reflectance images;

spatially aligning the SLM reflectance images to the SLM reference image;

creating FLIM intensity images and photon arrival time data from the FLIM data signals;

dynamically optimizing an optical pinhole location and imaging focal plane of the FLIM signals by using real-time FLIM intensity signals to achieve a maximum FLIM photon flux rate and an optimized FLIM image contrast;

spatially aligning the FLIM intensity images and fluorescent lifetime data to the spatially aligned SLM reflectance images; and generating a look up table to remove sinusoidal distortion.

8. The method of claim 7, wherein the step of spatial aligning the FLIM intensity images and fluorescent lifetime data and the SLM reflectance images comprises correcting for sample movement.

9. The method of claim 7, further comprising:

calculating transverse chromatic aberration (TCA) between the spatially aligned FLIM intensity images and SLM reflectance images;

compensating for TCA variation encoded in the FLIM intensity images and FLIM photon arrival time data signals;

receiving timing marks from the SLM data acquisition system based on when the SLM data acquisition system starts and stops recording;

removing FLIM data signals outside of a timing window described by the timing marks; and removing scan image distortion from the data signals, wherein the distortion removed from the scanning system is sinusoidal distortion.

10. The method of claim 9, wherein the timing marks include the time when the SLM system starts data signal recording, the time when the SLM system stop data signal recording, a periodic time of a frame synchronization clock of the SLM system, and a periodic time of a line synchronization clock of the SLM system.

11. The method of claim 7, further comprising acquiring data signals via the FLIM system and SLM system simultaneously.

12. The method of claim 7, further comprising aligning forward scan data signals in a first data region and backward scan data signals in a second region of the data signals.

13. The method of claim 7, further comprising mirroring the identified backward scan data signals and averaging the mirrored backward scan data signals with the forward scan data signals to increase the signal to noise ratio.

14. The method of claim 7, further comprising cropping data signals from the time that the scanning mirrors are retracting.

15. The method of claim 7, further comprising co-registering the data signals post processing via a strip level motion calculation to improve resolution by accounting for finer sample movement.

16. The method of claim 7, wherein the SLM system comprises a scanning light ophthalmoscopy (SLO) system or adaptive optics scanning light ophthalmoscopy (AOSLO) system.

17. A microscopy imaging method, comprising:

providing a fluorescence lifetime imaging microscopy (FLIM) system comprising a pulsed light source configured to direct a plurality of light pulses onto a sample, a photo detector configured to detect emitted fluorescent photons created by the plurality of excitation pulses interacting with the sample, and a FLIM data acquisition system configured to measure the time interval between the excitation light pulses and the detected emitted fluorescent photons;

providing a scanning light microscopy (SLM) system comprising a SLM data acquisition system, a fast scanning mirror and a slow scanning mirror, wherein the mirrors are configured to scan the light pulses across the sample;

providing a data processing system communicatively connected to the FLIM and SLM systems;

sending at least one synchronization trigger signal from the SLM system to the FLIM system, wherein the at least one synchronization trigger signal is provided by a Field Programmable Gate Array (FPGA);

receiving acquired data signals from the FLIM and SLM data acquisition systems;

creating SLM reflectance images from the SLM data signals;

choosing a reference image from the recorded SLM reflectance images;

spatially aligning the SLM reflectance images to the SLM reference image;

creating FLIM intensity images and photon arrival time data from the FLIM data signals;

dynamically optimizing an optical pinhole location and imaging focal plane of the FLIM signals by using real-time FLIM intensity signals to achieve a maximum FLIM photon flux rate and an optimized FLIM image contrast; and spatially aligning the FLIM intensity images and fluorescent lifetime data to the spatially aligned SLM reflectance images.

* * * * *